US009027118B2

(12) United States Patent
Ohba et al.

(10) Patent No.: US 9,027,118 B2
(45) Date of Patent: May 5, 2015

(54) IMAGE PROCESSING APPARATUS, CONTROL METHOD, AND COMPUTER-READABLE STORAGE MEDIUM FOR COMPUTER PROGRAM

(75) Inventors: Shin Ohba, Kokubunji (JP); Tomoyuki Atsumi, Toyohashi (JP); Kaoru Fukuoka, Toyokawa (JP); Eiichi Narimatu, Toyokawa (JP); Tomohide Tatara, Toyokawa (JP)

(73) Assignee: Konica Minolota, Inc., Chiyoda-Ku, Tokyo (JP)

( * ) Notice: Subject to any disclaimer, the term of this patent is extended or adjusted under 35 U.S.C. 154(b) by 247 days.

(21) Appl. No.: 13/330,341

(22) Filed: Dec. 19, 2011

(65) Prior Publication Data
US 2012/0159618 A1    Jun. 21, 2012

(30) Foreign Application Priority Data

Dec. 20, 2010 (JP) ................................ 2010-282508

(51) Int. Cl.
| G06F 7/04 | (2006.01) |
|---|---|
| G06F 17/30 | (2006.01) |
| G06F 15/16 | (2006.01) |
| G06F 12/00 | (2006.01) |
| G06F 12/14 | (2006.01) |
| G06F 13/00 | (2006.01) |

(Continued)

(52) U.S. Cl.
CPC ............ *G06F 21/608* (2013.01); *G06F 3/1203* (2013.01); *G06F 3/1238* (2013.01); *G06F 2221/2113* (2013.01)

(58) Field of Classification Search
CPC .... G06F 3/1203; G06F 3/1238; G06F 21/608
See application file for complete search history.

(56) References Cited

U.S. PATENT DOCUMENTS

| 6,369,909 B1 * | 4/2002 | Shima .......................... 358/1.15 |
| 6,940,615 B1 * | 9/2005 | Shima .......................... 358/1.15 |

(Continued)

FOREIGN PATENT DOCUMENTS

| JP | 2003-316552 | 11/2003 |
| JP | 2004-201069 | 7/2004 |

(Continued)

OTHER PUBLICATIONS

Notification of Reason(s) for Refusal mailed Jan. 29, 2013, directed to JP Application No. 2010-282508; 5 pages.

(Continued)

*Primary Examiner* — Azizul Choudhury
(74) *Attorney, Agent, or Firm* — Buchanan Ingersoll & Rooney PC

(57) ABSTRACT

An image processing apparatus performs specific processing on images read out of a document having pages as follows. Each of the pages is a member assigned to at least any one of groups. The apparatus determines a second security level of each group based on a first security level of each page of the corresponding group; before the specific processing on the N-th group, determines whether or not password entry is necessary based on the second security level of the N-th group and any of the second security levels of the first group through the (N−1)-th group; and performs the specific processing on the N-th group if it is determined that password entry is unnecessary for the N-th group, or, alternatively, if it is determined that password entry is necessary for the N-th group and if a password is appropriately entered.

11 Claims, 20 Drawing Sheets

(51) Int. Cl.
*G11C 7/00* (2006.01)
*H04N 7/16* (2011.01)
*H04L 29/06* (2006.01)
*G06F 21/60* (2013.01)
*G06F 3/12* (2006.01)

(56) References Cited

U.S. PATENT DOCUMENTS

| | | | |
|---|---|---|---|
| 7,011,462 B2 * | 3/2006 | Hanaoka | 400/76 |
| 7,801,918 B2 * | 9/2010 | Iwase | 707/785 |
| 7,936,467 B2 * | 5/2011 | Shimizu | 358/1.15 |
| 8,171,557 B2 * | 5/2012 | Jones et al. | 726/26 |
| 2004/0012812 A1 * | 1/2004 | Shimizu | 358/1.15 |
| 2004/0184065 A1 | 9/2004 | Guan et al. | |
| 2006/0031674 A1 * | 2/2006 | Sakurai | 713/166 |
| 2007/0236718 A1 | 10/2007 | Yokomura et al. | |
| 2007/0255949 A1 | 11/2007 | Miyazaki et al. | |
| 2008/0104707 A1 * | 5/2008 | Saka et al. | 726/26 |
| 2008/0180740 A1 | 7/2008 | Kimura et al. | |
| 2009/0174901 A1 | 7/2009 | Shigehisa et al. | |
| 2010/0007710 A1 * | 1/2010 | Miyaso | 347/110 |

FOREIGN PATENT DOCUMENTS

| | | |
|---|---|---|
| JP | 2007-207019 | 8/2007 |
| JP | 2007-268930 | 10/2007 |
| JP | 2008-118215 | 5/2008 |
| JP | 2008-186176 | 8/2008 |
| JP | 2009-42890 | 2/2009 |
| JP | 2009-160846 | 7/2009 |

OTHER PUBLICATIONS

Decision to Grant a Patent mailed Aug. 6, 2013, directed to Japanese Application No. 2010-282508; 6 pages.

* cited by examiner

DISPLAY JOB

JOB LIST | STATUS
REGISTRATION SOURCE | ACTIVE
PATTERN

DELETE

JOB DETAILS

Y M C K

PLEASE DESIGNATE A PAGE, ENTER A PASSWORD, AND SELECT ENCRYPTION ALGORITHM. — F11

DESIGNATE PAGE: PAGE 4 ▶
- PAGE 1
- PAGE 2
- DEFAULT
- ADD NEW PAGE...

PASSWORD — F12

1 2 3 4 5 6 7 8 9 0 - BACKSPACE KANA/KANJI
q w e r t y u i o p @
a s d f g h j k l ; :
z x c v b n m , . / ¥
SHIFT KANA/kana SPACE/CONVERSION (NEXT OPTION) CONFIRM

ENCRYPTION ALGORITHM — F13
● DES
○ AES

EXECUTE    CANCEL — F14

2007/08/29 19:59
AVAILABLE MEMORY 30%

| PAGE NUMBER (LT1a) | PROTECTION OPTION INFORMATION (LT1b) | PASSWORD INFORMATION (LT1c) | ENCRYPTION METHOD INFORMATION (LT1d) |
|---|---|---|---|
| 1 | YES | PASS1 | DES |
| 2 | NO | - | - |
| 3 | YES | PASS2 | AES |
| 4 | NO | - | - |
| 5 | YES | PASS3 | DES |
| 6 | NO | - | - |
| ⋮ | ⋮ | ⋮ | ⋮ |

FIG. 13
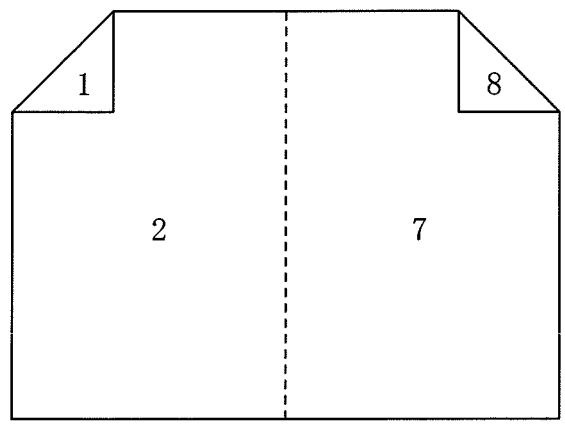
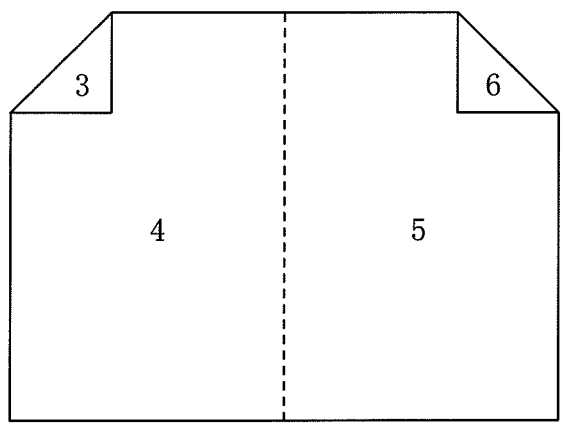

| PASSWORD COMPLEXITY | PASSWORD LENGTH | | |
|---|---|---|---|
| | 4 LETTERS OR SHORTER | 8 LETTERS OR SHORTER | 12 LETTERS OR SHORTER |
| ALL NUMERALS | 1 | 1 | 1 |
| ALL LOWERCASE ALPHABETS | 1 | 1 | 2 |
| ALL UPPERCASE ALPHABETS | 1 | 2 | 2 |
| ALL SYMBOLS | 1 | 2 | 2 |
| COMBINATION OF LOWERCASE AND UPPERCASE ALPHABETS | 2 | 2 | 2 |
| COMBINATION OF LOWERCASE AND UPPERCASE ALPHABETS AND NUMERALS | 2 | 2 | 3 |
| COMBINATION OF LOWERCASE AND UPPERCASE ALPHABETS, NUMERALS, AND SYMBOLS | 2 | 3 | 3 |
| COMBINATION OF LOWERCASE AND UPPERCASE ALPHABETS, NUMERALS, AND SYMBOLS ARRANGED EVERY THREE LETTERS | 2 | 3 | 4 |
| COMBINATION OF LOWERCASE AND UPPERCASE ALPHABETS, NUMERALS, AND SYMBOLS ARRANGED EVERY TWO LETTERS | 2 | 4 | 4 |

| | | PASSWORD LENGTH | | |
|---|---|---|---|---|
| | | 4 LETTERS OR SHORTER | 8 LETTERS OR SHORTER | 12 LETTERS OR SHORTER |
| PASSWORD COMPLEXITY | ALL NUMERALS | 1 | 1 | 2 |
| | ALL LOWERCASE ALPHABETS | 1 | 2 | 2 |
| | ALL UPPERCASE ALPHABETS | 1 | 2 | 2 |
| | ALL SYMBOLS | 1 | 2 | 2 |
| | COMBINATION OF LOWERCASE AND UPPERCASE ALPHABETS | 2 | 2 | 3 |
| | COMBINATION OF LOWERCASE AND UPPERCASE ALPHABETS AND NUMERALS | 2 | 3 | 3 |
| | COMBINATION OF LOWERCASE AND UPPERCASE ALPHABETS, NUMERALS, AND SYMBOLS | 2 | 3 | 3 |
| | COMBINATION OF LOWERCASE AND UPPERCASE ALPHABETS, NUMERALS, AND SYMBOLS ARRANGED EVERY THREE LETTERS | 2 | 3 | 4 |
| | COMBINATION OF LOWERCASE AND UPPERCASE ALPHABETS, NUMERALS, AND SYMBOLS ARRANGED EVERY TWO LETTERS | 3 | 4 | 4 |

| | LT4a | LT4b | LT4c |
|---|---|---|---|
| | PAGE NUMBER | PASSWORD INFORMATION | SECURITY INFORMATION |
| | 1 | PASS1 | 4 |
| | 2 | PASS2 | 1 |
| | 3 | PASS3 | 2 |
| | 4 | PASS4 | 4 |

| DOCUMENT PAGE NUMBER | OUTPUT PAPER PAGE NUMBER | PASSWORD | SECURITY LEVEL | NECESSITY/LACK OF NECESSITY OF PASSWORD ENTRY |
|---|---|---|---|---|
| 1 | 1 | 123 | 1 | NON-REQUIRED |
| 2 | 2 | abc | 1 | NON-REQUIRED |
| 3 | 3 | Aa1 | 2 | NON-REQUIRED |
| 4 | 4 | 345 | 1 | NON-REQUIRED |
| 5 | 5 | Aa1 | 2 | NON-REQUIRED |
| 6 | 6 | Aa1Bb2Cc3Dd4 | 4 | REQUIRED |
| 7 | 7 | ABCabc | 3 | NON-REQUIRED |
| 8 | 8 | Cc3 | 2 | NON-REQUIRED |

(columns: UC1a = PASSWORD, UC1b = SECURITY LEVEL, UC1c = NECESSITY/LACK OF NECESSITY OF PASSWORD ENTRY)

| DOCUMENT PAGE NUMBER | OUTPUT PAPER PAGE NUMBER | PASSWORD (UC2a) | SECURITY LEVEL (UC2b) | NECESSITY/LACK OF NECESSITY OF PASSWORD ENTRY (UC2c) |
|---|---|---|---|---|
| 1 | 1 | 123 | 1 | REQUIRED |
| 2 | 2 | abc | 1 | REQUIRED |
| 3 | 3 | Aa1 | 2 | REQUIRED |
| 4 | 4 | 345 | 1 | NON-REQUIRED |
| 5 | 5 | Aa1 | 2 | NON-REQUIRED |
| 6 | 6 | Aa1Bb2Cc3Dd4 | 4 | REQUIRED |
| 7 | 7 | ABCabc | 3 | NON-REQUIRED |
| 8 | 8 | Cc3 | 2 | NON-REQUIRED |

| DOCUMENT PAGE NUMBER | OUTPUT PAPER PAGE NUMBER | PASSWORD | SECURITY LEVEL | NECESSITY/LACK OF NECESSITY OF PASSWORD ENTRY |
|---|---|---|---|---|
| 1 | 1 | 123 | 1 | REQUIRED (PAGE 1 OR PAGE 2) |
| 2 | | abc | 1 | |
| 3 | 2 | Aa1 | 2 | REQUIRED |
| 4 | | 345 | 1 | NON-REQUIRED |
| 5 | 3 | Aa1 | 2 | NON-REQUIRED |
| 6 | | Aa1Bb2Cc3Dd4 | 4 | REQUIRED |
| 7 | 4 | ABCabc | 3 | NON-REQUIRED |
| 8 | | Cc3 | 2 | NON-REQUIRED |

Columns: UC3a (PASSWORD), UC3b (SECURITY LEVEL), UC3c (NECESSITY/LACK OF NECESSITY OF PASSWORD ENTRY)

IMAGE PROCESSING APPARATUS, CONTROL METHOD, AND COMPUTER-READABLE STORAGE MEDIUM FOR COMPUTER PROGRAM

This application is based on Japanese patent application No. 2010-282508 filed on Dec. 20, 2010, the contents of which are hereby incorporated by reference.

BACKGROUND OF THE INVENTION

1. Field of the Invention

The present invention relates to an image processing apparatus for performing processing on image data on which security is provided, and so on.

2. Description of the Related Art

Copiers have recently attained widespread use for producing duplicates of a document in offices of business, offices of public organizations, and homes.

The spread of copiers enables people to make a copy easily. However, the prevalence of copiers may cause undesirable effects such as leakage of duplicates of confidential documents, and misuse of duplicates of the original documents.

To cope with this, there have been proposed various approaches for enhancing the security of a copier.

One of such approaches is as follows. During a print process of a document, a specific pattern called a background pattern or the like is printed in the background of the document. Then, when the document having the background pattern is read in a copier, producing an output such as printing is restricted.

For example, the technique has been proposed in which, when image information of an original read by a reading means is printed out, a password is added to the image information that is a confidential document (Japanese Laid-open Patent Publication No. 2003-316552).

The following technique has also been proposed. A background pattern embedded in the background of an image obtained by an image obtaining means is extracted. When the extracted background pattern coincides with a predetermined pattern, an image is prohibited from being outputted by an image output means unless a user is verified based on his/her user ID and password entered by him/her (Japanese Laid-open Patent Publication No. 2004-201069).

Another technique has been proposed in which background patterns added to a plurality of regions contained in one page of a document are detected; and a user is requested to enter a password depending on the detected background pattern (Japanese Laid-open Patent Publication No. 2008-118215). This technique increases flexibility in security.

Another technique has also been proposed in which the security of an image forming apparatus is ensured and the use efficiency of hardware resources of the image forming apparatus is improved (Japanese Laid-open Patent Publication No. 2009-160846).

As described above, it has been suggested that a copier is equipped with the following function: when a document to which background patterns are added for each page of the document or for each region contained therein is read, a duplicate of the document is not outputted unless a user is verified based on a password entered by him/her, and the like. The function is sometimes called, for example, a password-protected copy function.

Such a password-protected copy function equipped in a copier restricts the use thereof. Specifically, making a copy of highly-confidential documents and the like is restricted. This improves the security of the copier; however, sometimes reduces the usability of the copier for users.

To be specific, when using the copier equipped with the password-protected copy function, a user is required to enter a password or the like every time a background pattern is detected in a document before outputting all the pages of the document, which sometimes bothers the user.

For example, when the user intends to make a copy of a document containing a plurality of pages to each of which a different background pattern is added, he/she is required to enter a password or the like every time one page is outputted.

SUMMARY

The present disclosure is directed to solve the problems pointed out above, and therefore, an object of an embodiment of the present invention is to provide an easy-to-use copier in which the security is ensured.

An image processing apparatus according to an aspect of the present invention is an image processing apparatus for performing specific processing on each of images depicted on a plurality of pages of a document, each of the plurality of pages being a member assigned to at least any one of a plurality of groups. The image processing apparatus includes an obtaining portion configured to obtain a password set for each of the plurality of pages; a level determining portion configured to determine first security levels of the plurality of pages, and to determine, as a second security level of each of the plurality of groups, a first security level having a highest degree of security among the first security levels of the members of the plurality of groups; an entry necessity determining portion configured to, before the specific processing on an N-th (N≥2) group of the plurality of groups, determine that entering an execution password is necessary if the second security level of the N-th group is higher than a second security level having a highest degree of security among the second security levels of a 1st group through an (N−1)-th group by a first predetermined level or more, and determine that entering the execution password is unnecessary if the second security level of the N-th group is smaller than said second security level by a second predetermined level or more, the execution password being the password set for a member whose first security level has a same degree of security as that of the second security level of the N-th group among the members of the N-th group; and a specific processing execution portion configured to perform the specific processing on the N-th group if the entry necessity determining portion determines that entering the execution password is unnecessary for the N-th group, or, alternatively, if the entry necessity determining portion determines that entering the execution password is necessary for the N-th group and if the execution password is appropriately entered.

These and other characteristics and objects of the present invention will become more apparent by the following descriptions of preferred embodiments with reference to drawings.

BRIEF DESCRIPTION OF THE DRAWINGS

FIG. 5 is a diagram showing an example of a password entry screen displayed on a display portion.

FIG. 6 is a diagram showing an example of a protection page list.

FIG. 13 is a diagram showing an example of printing in a booklet mode.

FIG. 14 is a diagram showing an example of a first determination table.

FIG. 15 is a diagram showing an example of a second determination table.

FIG. 16 is a diagram showing an example of an output target page list.

FIG. 18 is a diagram showing an example of an outline for a first case.

FIG. 19 is a diagram showing an example of an outline for a second case.

FIG. 20 is a diagram showing an example of an outline for a third case.

DESCRIPTION OF THE PREFERRED EMBODIMENTS

Figure 1:
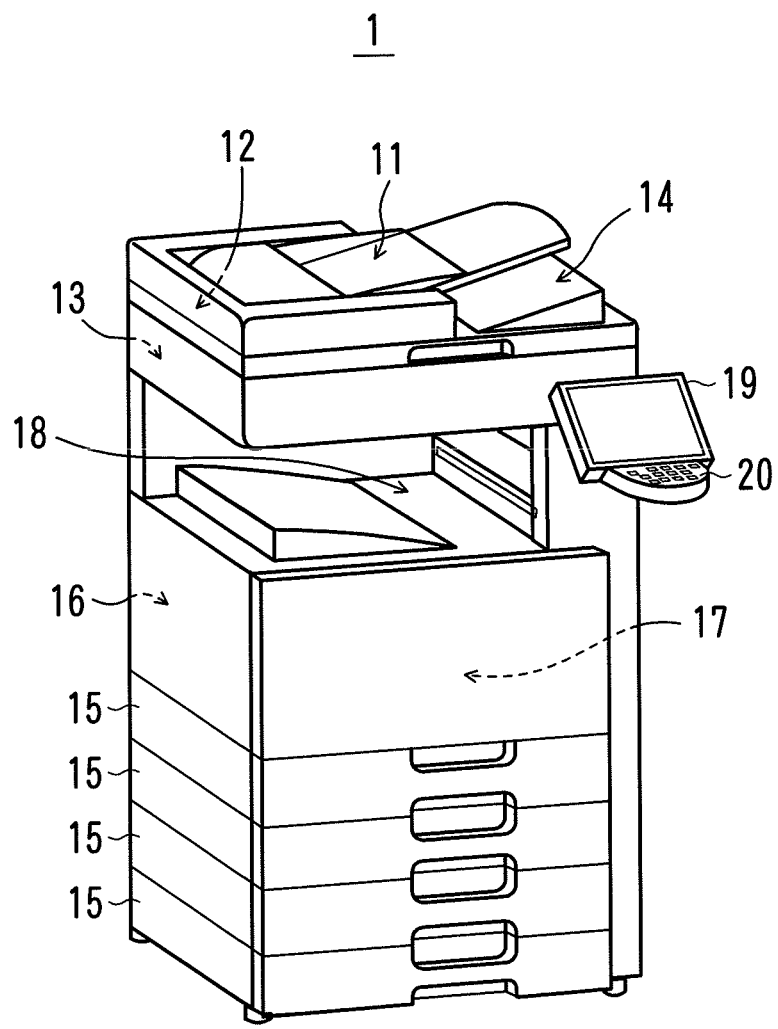
FIG. 1 is a perspective view showing an example of an image processing apparatus.

FIG. 1 is a perspective view showing an example of an image processing apparatus 1.

The image processing apparatus 1 is an information processing device that integrates a variety of functions, such as copying, network printing (PC printing), scanning, faxing, and document server, into a single unit. The image processing apparatus 1 is sometimes called, for example, a "multifunction device" or a "Multi-Functional Peripheral (MFP)". In general, the image processing apparatus 1 is connected to a network such as a Local Area Network (LAN) for use.

Referring to FIG. 1, the image processing apparatus 1 is provided with a document sheet feeder 11, a document conveying portion 12, a document reader unit 13, a document outlet portion 14, a paper supplying portion 15, a paper conveying portion 16, a printing unit 17, a paper outlet portion 18, a display portion 19, an operating portion 20, a non-illustrated control unit, and so on.

The document sheet feeder 11 is a tray onto which a document to be read is placed.

The document conveying portion 12 is provided with a roller, a driver thereof, and so on. The document conveying portion 12 is operable to convey, to the document reader unit 13, each sheet constituting the document placed on the document sheet feeder 11, and to output the document read by the document reader unit 13 to the document outlet portion 14.

The combination of the document sheet feeder 11, the document conveying portion 12, and the document outlet portion 14 is sometimes called an Automatic Document Feeder (ADF).

The document reader unit 13 is provided with a light source, an image sensor, and so on. The document reader unit 13 is to optically capture an image such as a character, a chart, and a symbol depicted on paper to create image data thereof.

The paper supplying portion 15 is a tray in which paper used for printing is placed.

The paper conveying portion 16 is provided with a roller, a driver thereof, and so on. The paper conveying portion 16 is operable to carry sheets of paper, one by one, contained in the paper supplying portion 15 to the printing unit 17, and to output the sheets of paper subjected to printing by the printing unit 17 to the paper outlet portion 18.

The printing unit 17 is implemented by using an electrophotographic print mechanism, an inkjet print mechanism, or a thermal transfer print mechanism. The printing unit 17 serves to print an image onto paper based on data created by the document reader unit 13, data saved in the image processing apparatus 1, and data received from another information processing device via the network, or the like, depending on the type of a job to be executed, e.g., a copy job, a print job, or a FAX job.

The display portion 19 is provided with, for example, a liquid crystal display, and is operable to display a variety of screens for a user. Such screens are displayed on the display. The screens are, for example, a screen for operation guidance, a screen for informing the user of a job execution state, and a screen for the user to check data saved in the image processing apparatus 1.

The operating portion 20 is provided with a numeric keypad and various operation buttons, and is operable to receive operation performed by the user. In the case where the display of the display portion 19 is used also as a touch-sensitive panel, the operating portion 20 receives various operation by detecting the position on the display touched by the user.

Figure 2:
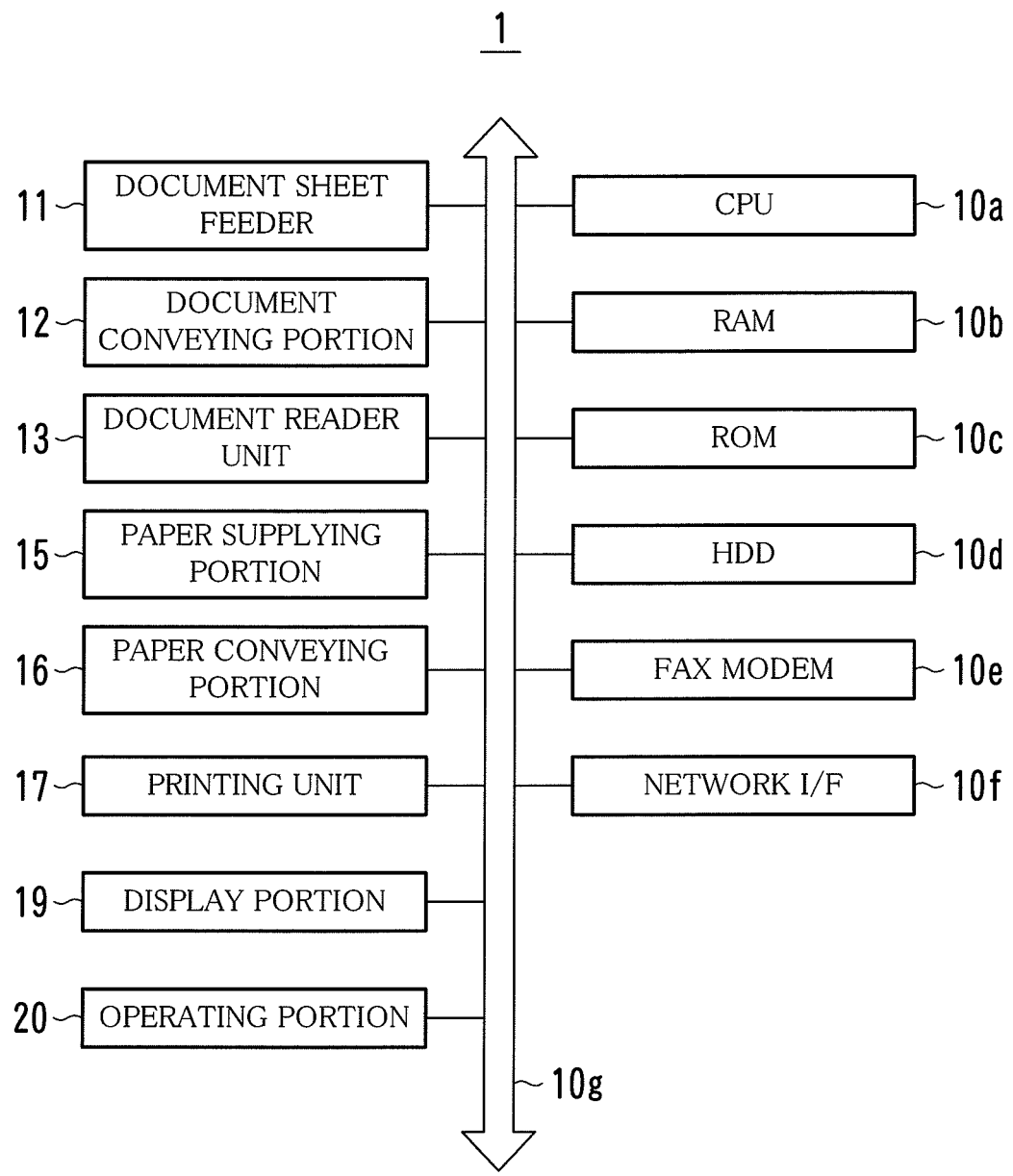
FIG. 2 is a diagram showing an example of the hardware configuration of an image processing apparatus.

FIG. 2 is a diagram showing an example of the hardware configuration of the image processing apparatus 1.

Referring to FIG. 2, in addition to the foregoing structural portions 11-20, the image processing apparatus 1 is internally provided with a Central Processing Unit (CPU) 10a, a Random Access Memory (RAM) 10b, a Read Only Memory (ROM) 10c, a Hard Disk Drive (HDD) 10d, a FAX modem 10e, a network Interface (I/F) 10f, and so on, which are connected to one another via an internal bus 10g.

The CPU 10a executes operation processing using the RAM 10b as a work area based on programs and data stored in the ROM 10c or the HDD 10d, and various data sets externally entered as required. Specifically, the CPU 10a controls the operation by the individual structural portions 11-20, the HDD 10d, the FAX modem 10e, the network Interface (I/F) 10f, and so on, and thereby implements various functions.

The HDD 10d is a non-volatile magnetic storage device for retaining data stored therein even when no power is supplied. Instead of the HDD 10d, a semiconductor memory such as a flash memory or a Solid State Drive (SSD) may be used.

The FAX modem 10e serves to send and receive data with other FAX machines via a public line. For sending and receiving data, a FAX protocol such as G3 is used.

The network I/F 10f serves to send and receive data with other information processing devices via the network such as the LAN. For sending and receiving data, communication protocol such as Transmission Control Protocol/Internet Protocol (TCP/IP) is used.

[Addition of Background Pattern]

First, descriptions are given of processing performed when a background pattern is added to a document.

Figure 3:
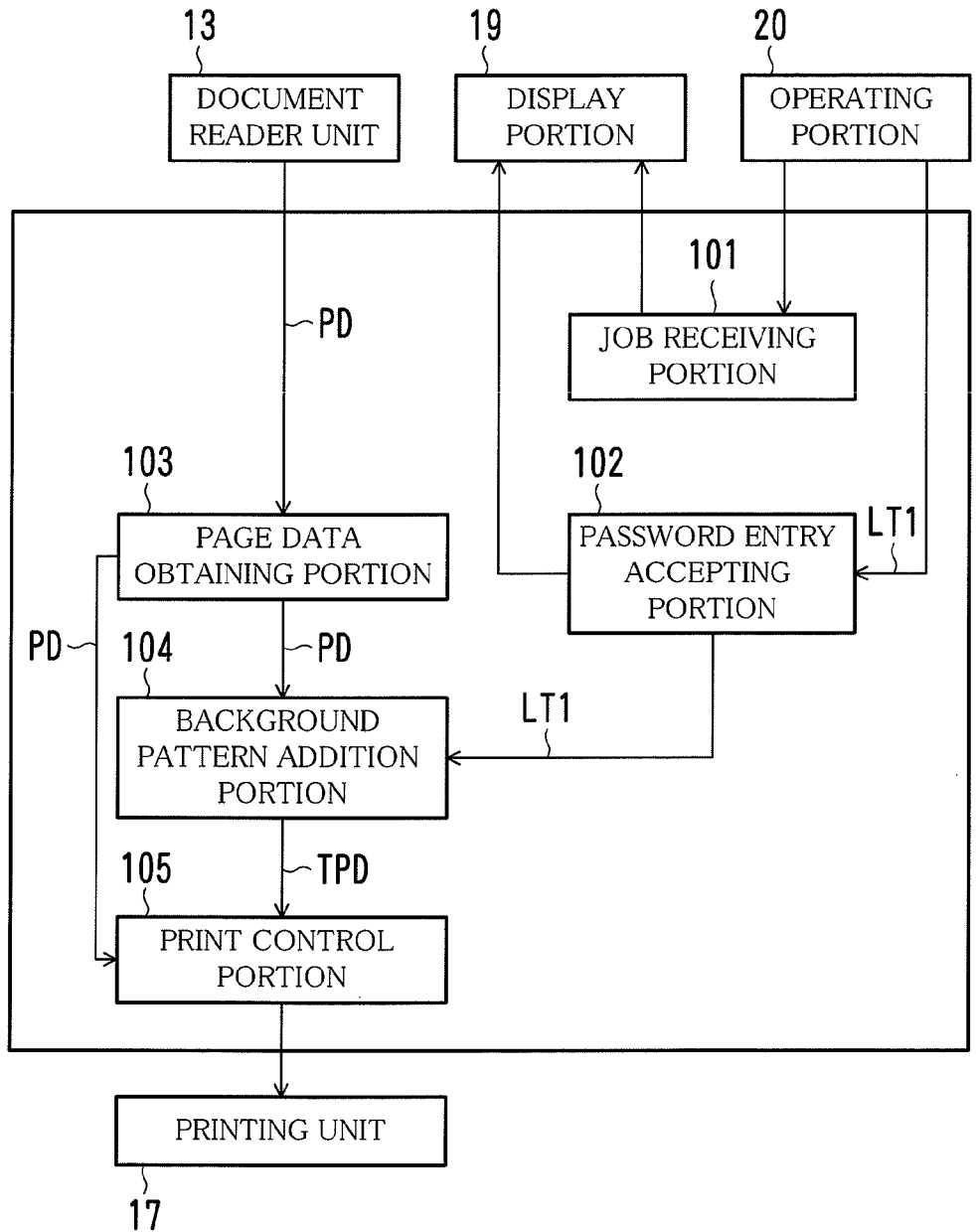
FIG. 3 is a diagram showing an example of the configuration of a control function, of an image processing apparatus, involved in processing for adding a background pattern to a document.

FIG. 3 is a diagram showing an example of the configuration of a control function, of the image processing apparatus 1, involved in the processing for adding a background pattern to a document.

Referring to FIG. 3, the image processing apparatus 1 is configured of control portions for performing control when a background pattern is added. The control portions are, for example, a job receiving portion 101, a password entry accepting portion 102, a page data obtaining portion 103, a background pattern addition portion 104, and a print control portion 105. The ROM 10c or the HDD 10d stores, therein, programs for implementing the functions of the control portions 101 through 105. The CPU 10a executes the programs appropriately.

Figure 4:
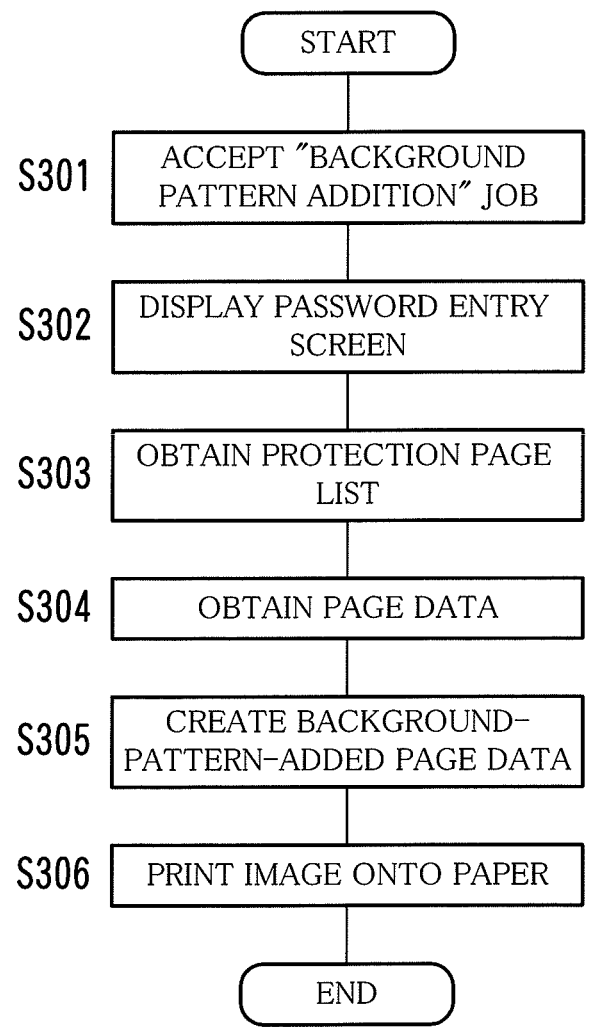
FIG. 4 is a flowchart depicting an example of processing for adding a background pattern to a document.
Figure 7:
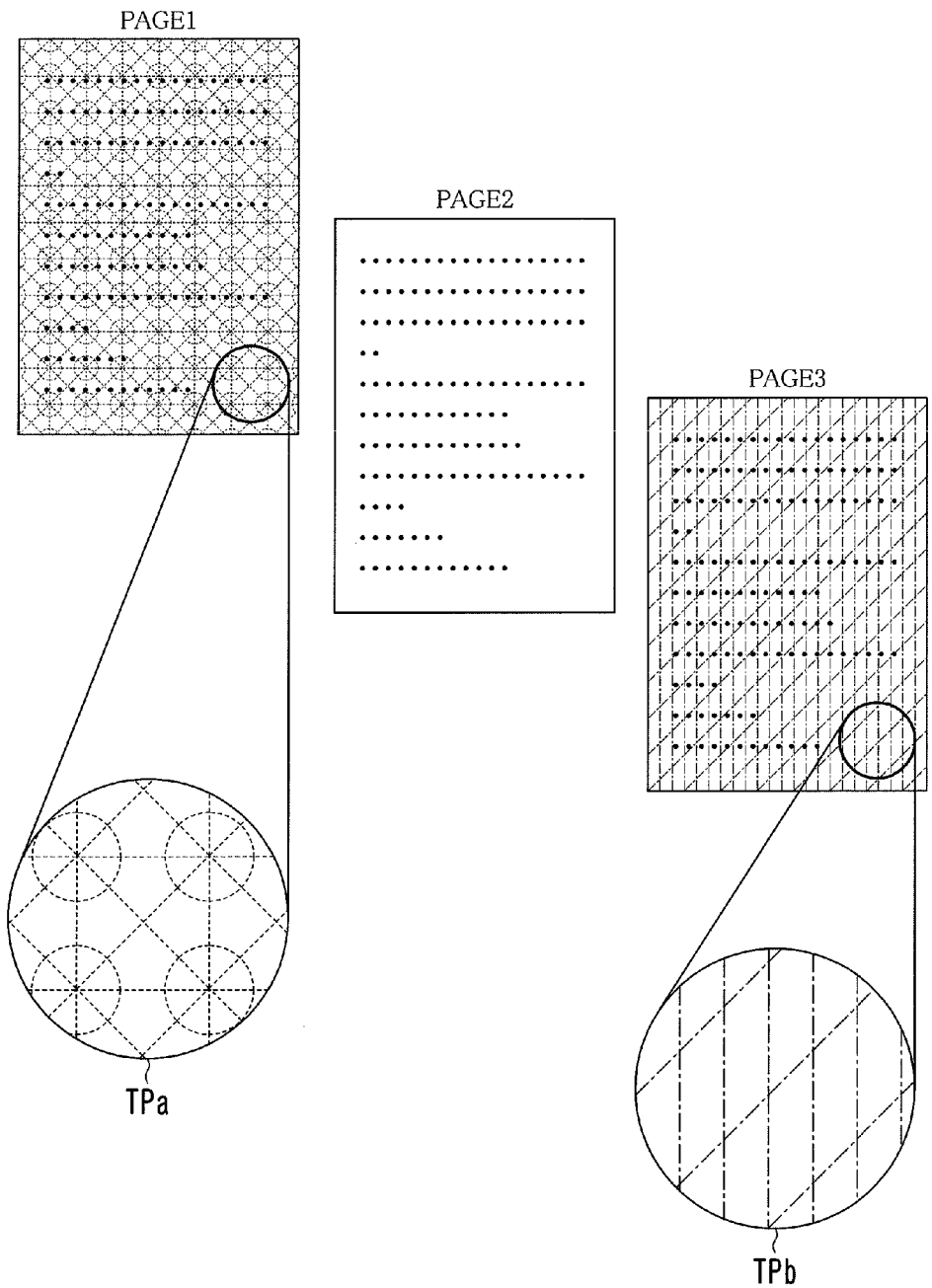
FIG. 7 is a diagram showing an example of a document to which background patterns are added.

FIG. 4 is a flowchart depicting an example of processing for adding a background pattern to a document; FIG. 5 is a diagram showing an example of a password entry screen HG1 displayed on the display portion 19; FIG. 6 is a diagram showing an example of a protection page list LT1; and FIG. 7 is a diagram showing an example of a document to which background patterns TP are added.

Descriptions are provided below of processing performed by the individual control portions 101 through 105 with reference to the flowchart of FIG. 4.

A user places a document having a plurality of pages on the document sheet feeder 11, selects a "background pattern addition" menu in the operating portion 20, and presses an EXECUTE button.

Responding to this operation, the job receiving portion 11 accepts a command to execute a "background pattern addition" job through the operating portion 20 (Step S301 of FIG. 4).

When the "background pattern addition" job is accepted (Step S301), the password entry accepting portion 102 displays the password entry screen HG1 as that shown in FIG. 5 on the display portion 19 (Step S302).

The user, then, enters the page number of a page on which security is to be provided for protection in a "page designation" entry field F11 of the password entry screen HG1. The user also enters an appropriate password used to protect the page in a "password" entry field F12.

At this time, the user enters a more complicated password for a page on which tighter security should be provided. For example, the user sets a longer password for a page on which a higher level of security should be provided. Alternatively, the user sets a complicated password for such a page by using many types of letters, e.g., uppercase letters, lowercase letters, numerals, and signs.

In the meantime, passwords are encrypted before management in this embodiment. Accordingly, the user selects a password encryption method in an "encryption algorithm" selection field F13. In this embodiment, the user is allowed to select, as the password encryption method, any one of Data Encryption Standard (DES) and Advanced Encryption Standard (AES).

Such selection may be made, for example, by choosing one of the candidates listed in a combo box, by checking a box provided adjacent to the candidates, or by pressing keys of a software keyboard.

The user performs the operation discussed above on all the pages on which security is to be provided for protection, and then, presses the "EXECUTE" button F14.

Upon the "EXECUTE" button F14 being pressed, the password entry accepting portion 102 obtains (generates) the protection page list LT1 as that shown in FIG. 6 through the operating portion 20 (Step S303).

The protection page list LT1 contains registered information, for each page, indicating a page number LT1a, protection option information LT1b showing whether or not the corresponding page should be protected, password information LT1c showing a value of a password set for the corresponding page, and encryption method information LT1d showing a password encryption method used for encrypting the password. The values set in the information LT1b through LT1d reflect the details entered by the user.

When the protection page list LT1 is obtained (Step S303), the page data obtaining portion 103 causes the document sheet feeder 11, the document conveying portion 12, the document reader unit 13, and so on to operate at an appropriate timing, and captures images depicted on all the pages of the document. The page data obtaining portion 103 acquires, as page data PD, data obtained by performing predetermined image processing on the data of the captured images (Step S304). The page data PD is data on a page-by-page basis, and is obtained by an amount corresponding to the number of all the pages of the document. The predetermined image processing herein is processing including A/D conversion, shading correction, line-to-line correction, resolution conversion, and gamma conversion.

When the page data PD for all the pages are obtained (Step S304), the background pattern addition portion 104 creates, for each set of page data PD, a background pattern TP to be added based on the protection page list LT1, and then, creates background-pattern-added page data TPD, which is page data to which a background pattern TP has been added (Step S305).

To be specific, the background pattern addition portion 104 refers to the protection page list LT1. As for a page for which the value "YES" is indicated in the protection option information LT1b, the background pattern addition portion 104 uses an encryption method shown in the encryption method information LT1d for that page to encrypt a password value indicated in the password information LT1c for that page. A value of an encryption key applied for the encryption may be a predetermined value or a value relating to the original password value. Hereinafter, a post-encryption password is sometimes referred to as an "encrypted password". The background pattern addition portion 104, then, creates a background pattern TP corresponding to the encrypted password value and the encryption method. Subsequently, the background pattern addition portion 104 combines the background pattern TP thus created with an image depicted on the page based on the page data PD, so that background-pattern-added page data TPD to which the background pattern TP is added is created. The background-pattern-added page data TPD serves as a part of print data to be delivered to the printing unit 17.

As for a page for which the value "NO" is indicated in the protection option information LT1b of the protection page list LT1, no background-pattern-added page data TPD is created; therefore, the page data PD serves as a part of print data to be delivered to the printing unit 17.

When the background pattern addition portion 104 creates background-pattern-added page data TPD for each of the pages to which the background pattern TP should be added (Step S305), the print control portion 105 delivers, with respect to the page for which the background-pattern-added page data TPD has been created, the background-pattern-added page data TPD to the printing unit 17, and, with respect to the page for which background-pattern-added page data TPD has not been created, the page data PD to the printing unit 17. At this time, the print control portion 105 also delivers print setting information and so on to the printing unit 17. The print control portion 105 controls the paper supplying portion 15, the paper conveying portion 16, the printing unit 17, and so on to operate at an appropriate timing in order that images based on the delivered data are printed onto paper (Step S306).

In this way, a printed matter is created which contains background patterns TP on pages desired by the user. For example, the printed matter as that shown in FIG. 7 is created. In the illustrated example, the printed matter has Page 1 on which an image is printed with a first background pattern TPa added to the background, Page 2 on which an image is printed with no background pattern TP added, and Page 3 on which an image is printed with a second background pattern TPb added to the background.

Note that the processing order, the processing unit, and so on in Step S301 through Step S306 are merely one example and are not limitative. For example, the following arrangement is also possible. Every time the page data obtaining portion 103 obtains page data PD for one page, the password entry accepting portion 102 receives information such as a password for that page from a user, the background pattern addition portion 104 creates background-pattern-added page data TPD for that page if necessary, and the print control portion 105 instructs the printing unit 17 to print out an image based on the background-pattern-added page data TPD or the page data PD for that page.

[Copy of a Document to which a Background Pattern is Added]

Second, descriptions are provided below of processing performed when a document to which a background pattern is added is copied.

Figure 8:
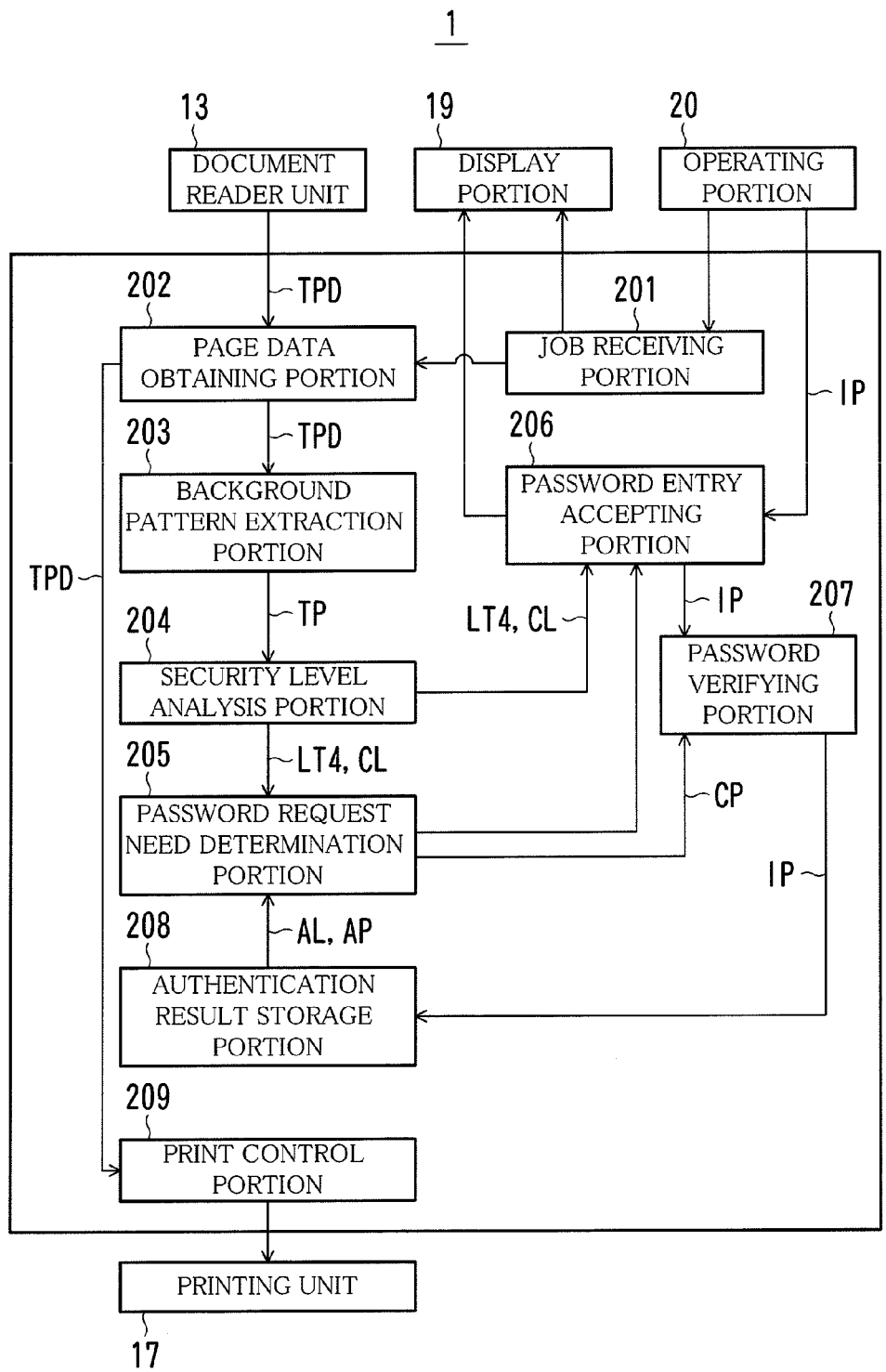
FIG. 8 is a diagram showing an example of the configuration of a control function, of an image processing apparatus, involved in processing for copying a document to which a background pattern is added.

FIG. 8 is a diagram showing an example of the configuration of a control function, of the image processing apparatus 1, involved in processing for copying a document to which a background pattern is added.

As shown in FIG. 8, the image processing apparatus 1 is configured of control portions for performing control when a document with a background pattern is copied. The control portions are, for example, a job receiving portion 201, a page data obtaining portion 202, a background pattern extraction portion 203, a security level analysis portion 204, a password request need determination portion 205, a password entry accepting portion 206, a password verifying portion 207, an authentication result storage portion 208, and a print control portion 209. The ROM 10c or the HDD 10d stores, therein, programs for implementing the functions of the control portions 201 through 209. The CPU 10a executes the programs appropriately.

Figure 9:
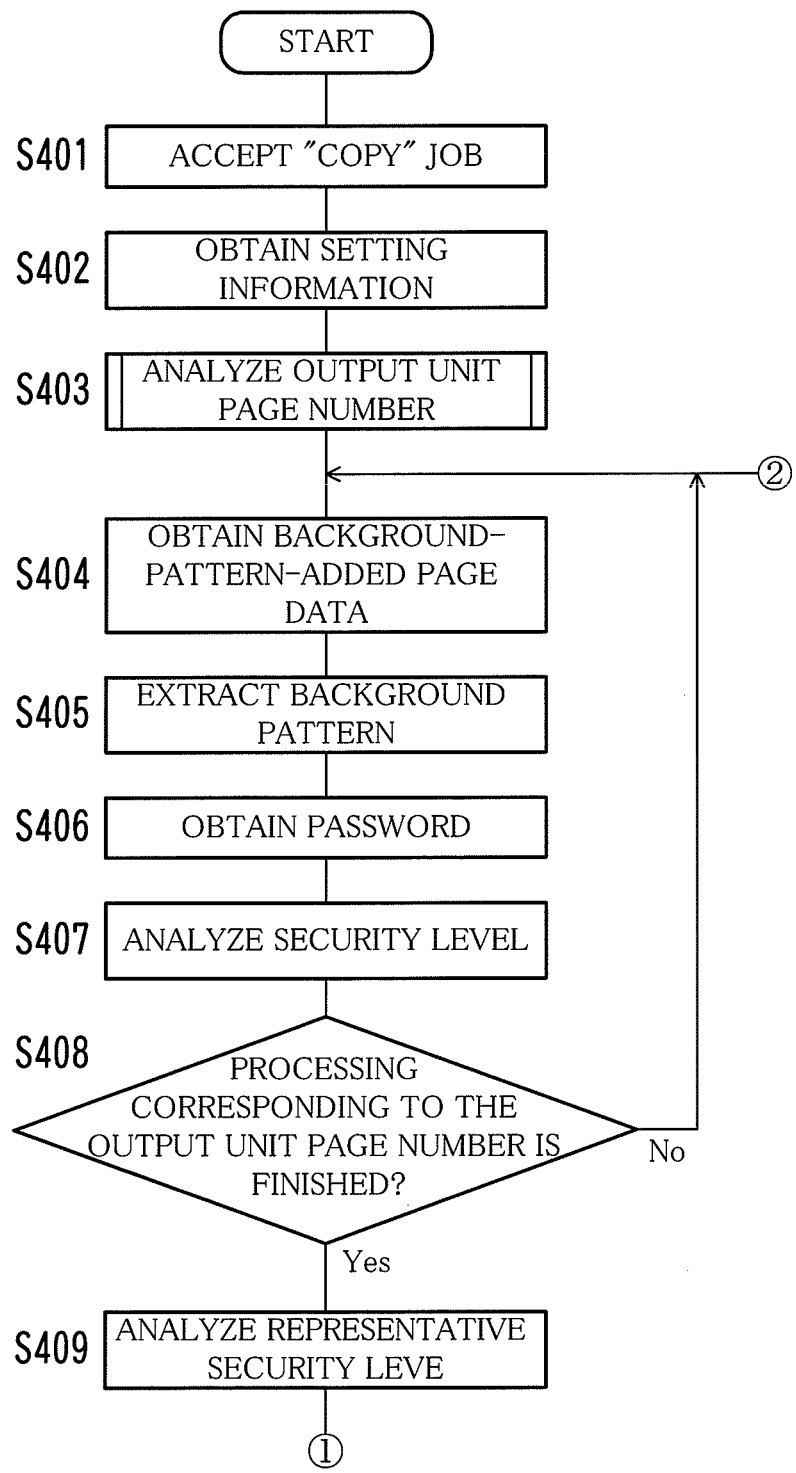
FIG. 9 is a flowchart depicting an example of processing for copying a document to which a background pattern is added.
Figure 10:
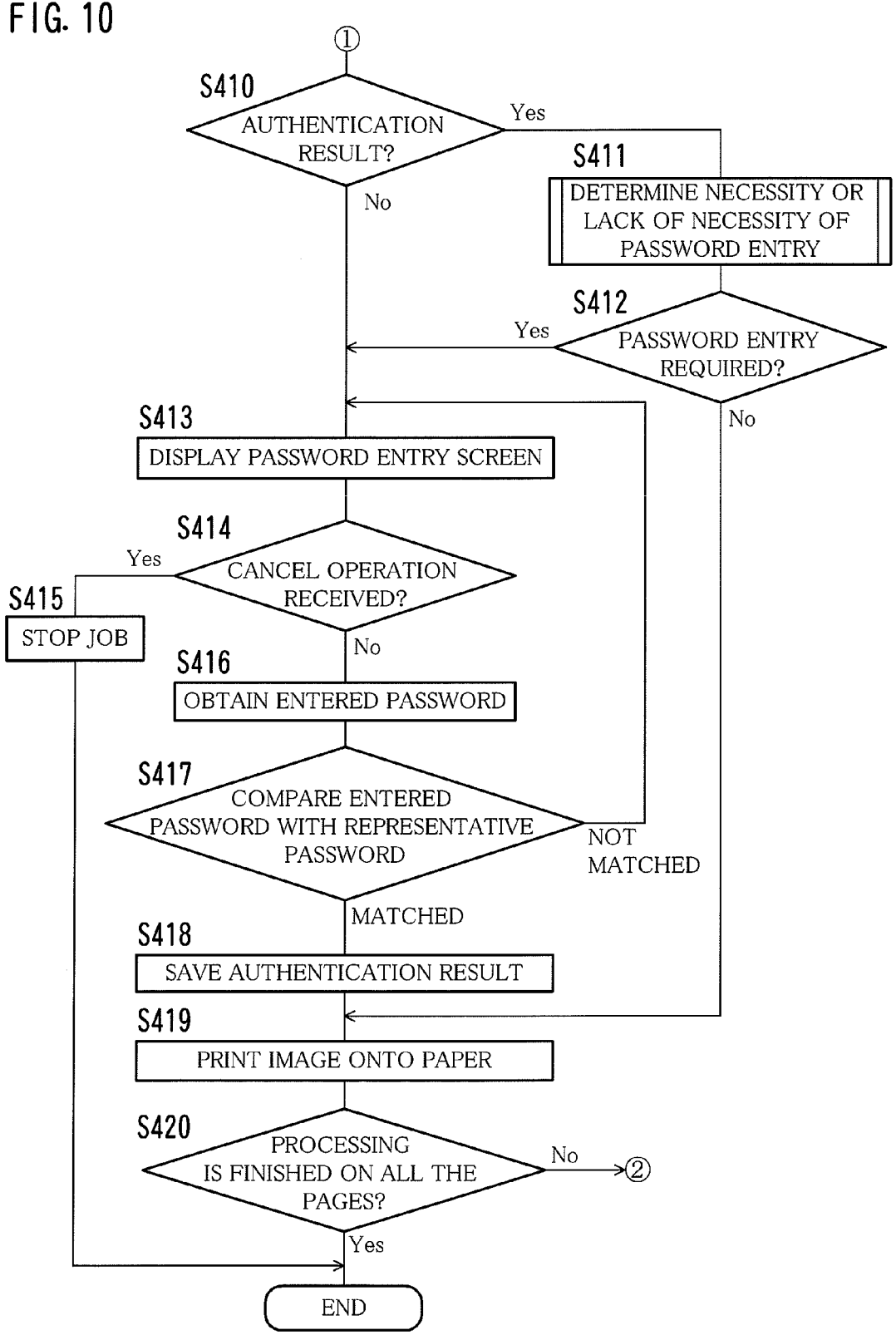
FIG. 10 is a flowchart depicting an example of processing for copying a document to which a background pattern is added.
Figure 11:
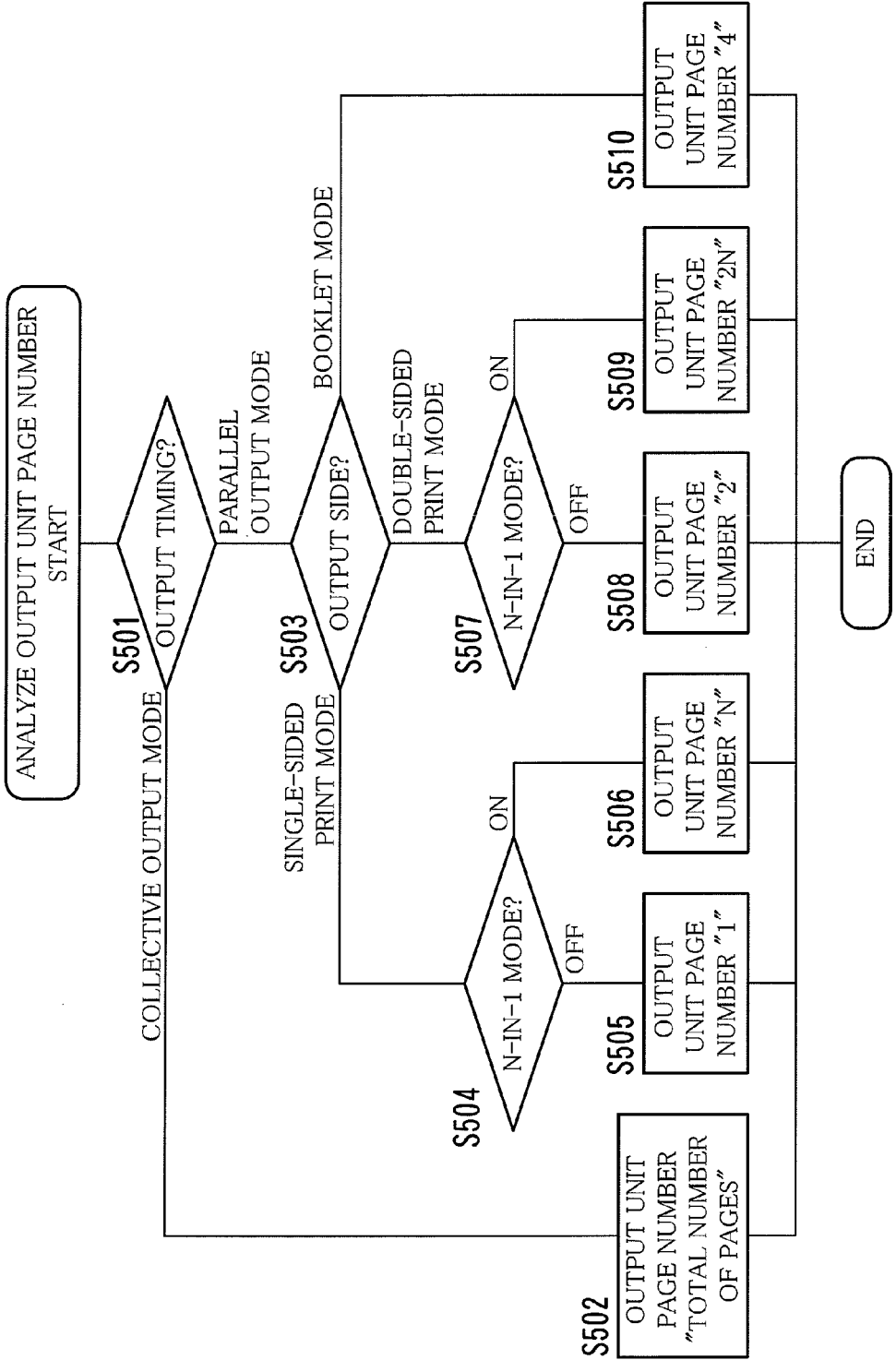
FIG. 11 is a flowchart depicting an example of processing for determining an output unit page number.
Figure 12:
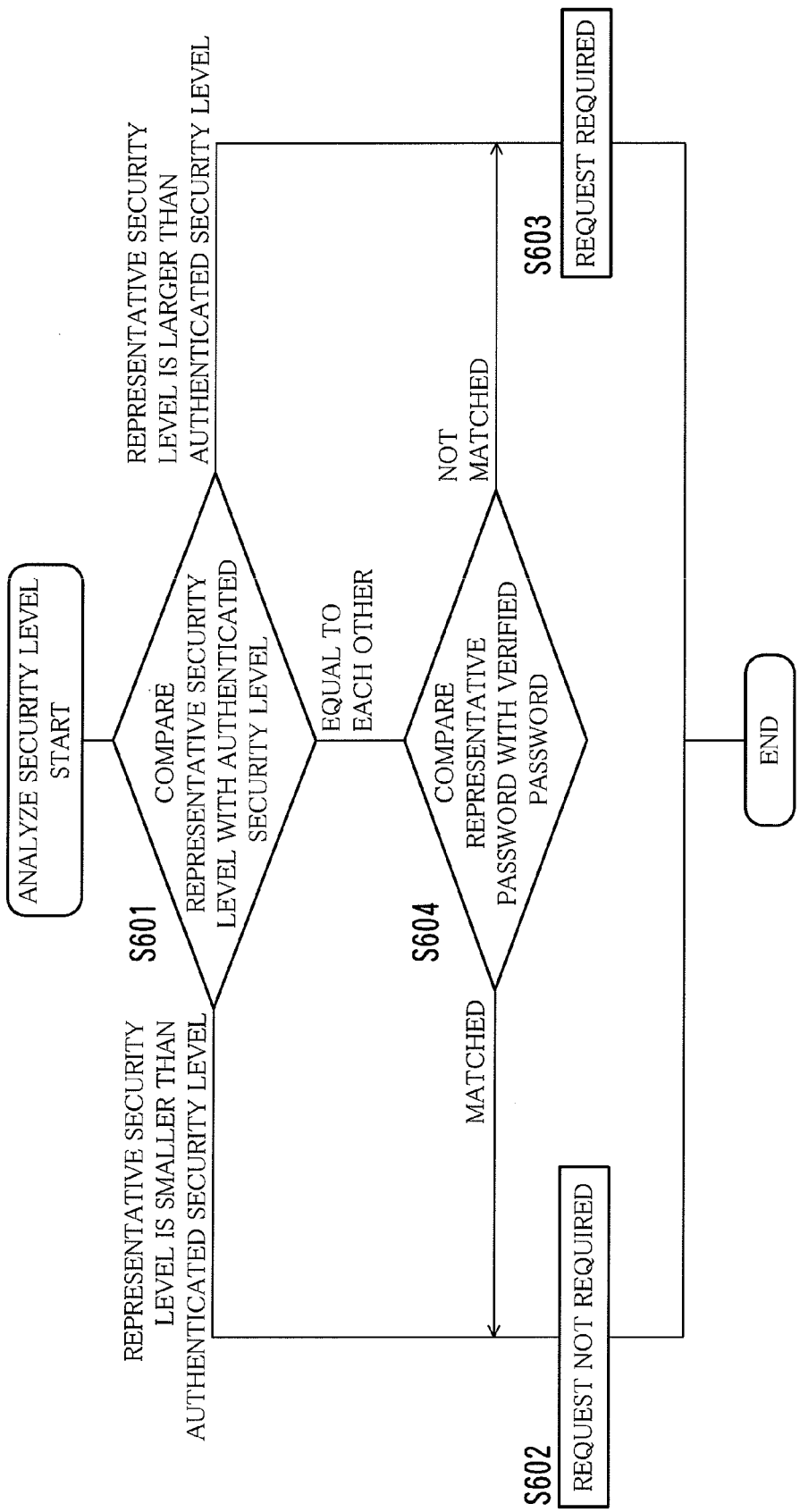
FIG. 12 is a flowchart depicting an example of processing for determining whether or not password entry is required.
Figure 17:
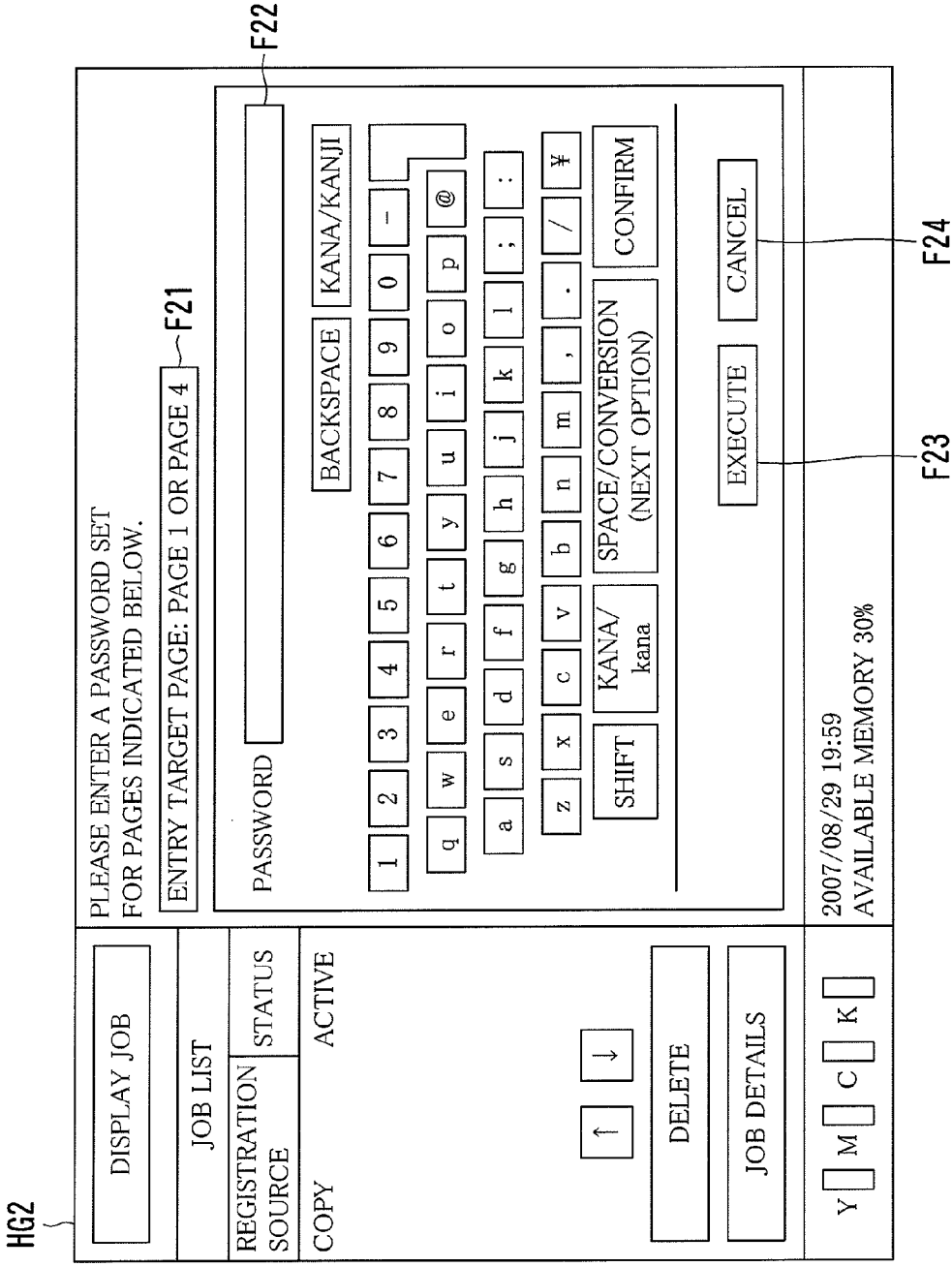
FIG. 17 is a diagram showing an example of a password entry screen displayed on a display portion.

FIGS. 9 and 10 are flowcharts depicting an example of processing for copying a document to which a background pattern is added; FIG. 11 is a flowchart depicting an example of processing for determining an output unit page number; FIG. 12 is a flowchart depicting an example of processing for determining whether or not password entry is required; FIG. 13 is a diagram showing an example of printing in a booklet mode; FIG. 14 is a diagram showing an example of a first determination table LT2; FIG. 15 is a diagram showing an example of a second determination table LT3; FIG. 16 is a diagram showing an example of an output target page list LT4; and FIG. 17 is a diagram showing an example of a password entry screen HG2 displayed on the display portion 19.

Descriptions are provided below of processing performed by the individual control portions 201 through 209 with reference to the flowcharts of FIGS. 9 and 10.

A user places, on the document sheet feeder 11, a document having a plurality of pages including a page to which a background pattern TP is added. The user, then, selects a "copy" menu in the operating portion 20, enters various settings for a copy job, and presses an EXECUTE button.

Responding to this operation, the job receiving portion 101 accepts a command to execute the "copy" job through the operating portion 20 (Step S401 of FIG. 9). The job receiving portion 101 also obtains information on various settings for the "copy" job (Step S402). With respect to settings explicitly designated by the user through the operating portion 20, the designated settings take effect. On the other hand, with respect to settings not explicitly designated by the user, default settings take effect. The settings are, for example, settings (1) through (5) discussed below.

(1) Setting for Document Face to be Scanned

A setting is made such that only one surface of a document is scanned, or, alternatively, both surfaces thereof are scanned.

Hereinafter, the former setting is sometimes called a "single-sided scan mode", and the latter setting is sometimes called a "double-sided scan mode".

Assume that, for example, a document having four sheets is scanned. In such a case, for the "single-sided scan mode", images corresponding to four pages in total are supposed to be scanned, and, for the "double-sided scan mode", images corresponding to eight pages in total are supposed to be scanned.

(2) Setting for Print Output Timing

As the print output timing, any one of the following two options is selected: printing is started after all the pages of a document placed in the document sheet feeder 11 are completely scanned; and printing is performed while pages of such a document are scanned.

Hereinafter, the former setting is sometimes called a "collective output mode", and the latter setting is sometimes called a "parallel output mode".

(3) Setting for Paper Face to be Printed

As the paper face to be printed, any one of the following first through third options is selected: (A) images are printed on only one surface of output paper; (B) images are printed on both surfaces thereof; and (C) printing suitable for creating a booklet is carried out.

Hereinafter, the first option is sometimes called a "single-sided print mode", the second option is sometimes called a "double-sided print mode", and the third option is sometimes called a "booklet mode".

According to the setting for "booklet mode", images depicted on a document are printed onto output sheets of paper in such a manner that a booklet can be created by binding an outputted printed matter by using a predetermined method, e.g., by saddle stitching. Thus, paper faces onto which the document images are outputted, the order that the document images are outputted, the layout of the document images, and the like are automatically adjusted according to the booklet mode.

As shown in FIG. 13, in the case where images depicted on an eight-page document are printed according to the "booklet mode" setting, images on Pages 1 and 8 of the document are printed onto one surface of the first sheet of output paper, and images on Pages 2 and 7 of the document are printed onto the other surface thereof. Further, images on Pages 3 and 6 of the document are printed onto one surface of the second sheet of output paper, and images on Pages 4 and 5 of the document are printed onto the other surface thereof.

(4) Setting for Document Page Layout

A setting is made for the number of pages of a document to be printed on one surface of a sheet of output paper.

Hereinafter, a setting that N-page (N≥2) document images are printed onto one surface of a sheet of output paper is sometimes expressed that an "N-in-1 mode" is ON, or, that an "N-page layout mode" is ON. Further, a setting that one-page document image is printed onto one surface of a sheet of output paper is sometimes expressed that the "N-in-1 mode" is OFF, or, that the "N-page layout mode" is OFF. Assume that, for example, images depicted on an eight-page document are printed onto output paper. In such a case, for the combination of "single-sided print mode" and "2-in-1 mode", images corresponding to a two-page document are printed per sheet of output paper. Thus, four sheets of output paper are used. For the combination of "double-sided print mode" and "2-in-1 mode", images corresponding to a four-page document are printed per sheet of output paper. Thus, two sheets of output paper are used.

(5) Other Settings

Settings are sometimes made for output paper size, a scaling factor for enlarged or reduced printing, and the like.

Referring back to FIG. 9, when the "copy" job is received (Step in S401), and when information on job settings is obtained (Step S402), the page data obtaining portion 202 determines an output unit page number, depending on the setting details of (2) through (4) discussed above, in the following manner (Step S403). The output unit page number is the number of pages of a document to be outputted per sheet of paper.

Referring to FIG. 11, the setting details of (2) discussed above are checked (Step S501). To be specific, it is checked whether the "collective output mode" or the "parallel output mode" is set as a print output timing.

If the "collective output mode" is selected in the setting of (2) (left in Step S501), then the page data obtaining portion 202 determines that the output unit page number is "total number of pages" (Step in S502).

If the "parallel output mode" is selected in the setting of (2) (downward in Step S501), then the page data obtaining portion 202 checks the setting details of (3) discussed above (Step S503). To be specific, it is checked which one of the "single-sided print mode", the "double-sided print mode", and the "booklet mode" is set as a paper face to be printed.

If the "single-sided print mode" is selected in the setting of (3) (left in Step S503), then the page data obtaining portion 202 checks the setting details of (4) discussed above (Step S504). If the "N-in-1 mode" is set to be OFF in the setting of (4) (downward in Step S504), then the page data obtaining portion 202 determines that the output unit page number is "1" (Step in S505). If the "N-in-1 mode" is set to be ON in the setting of (4) (right in Step S504), then the page data obtaining portion 202 determines that the output unit page number is "N" (Step in S506). To be specific, the page data obtaining portion 202 determines that the output unit page number is "2" for the "2-in-1 mode", and is "4" for the "4-in-1 mode".

If the "double-sided print mode" is selected in the setting of (3) (downward in Step S503), then the page data obtaining portion 202 checks the setting details of (4) (Step S507). If the "N-in-1 mode" is set to be OFF in the setting of (4) (downward in Step S507), then the page data obtaining portion 202 determines that the output unit page number is "2" (Step in S508). If the "N-in-1 mode" is set to be ON in the setting of (4) (right in Step S507), then the page data obtaining portion 202 determines that the output unit page number is "2N" (Step in S509).

To be specific, the page data obtaining portion 202 determines that the output unit page number is "4" for the "2-in-1 mode", and is "8" for the "4-in-1 mode".

If the "booklet mode" is selected in the setting of (3) (right in Step S503), then the page data obtaining portion 202 determines that the output unit page number is "4" (Step S510).

Referring back to FIG. 9, when determining the output unit page number (Step S403), the page data obtaining portion 202 causes the document sheet feeder 11, the document conveying portion 12, the document reader unit 13, and so on to operate at an appropriate timing, and captures images depicted on one page of the document. The page data obtaining portion 202 acquires, as background-pattern-added page data TPD', data obtained by performing predetermined image processing on the data of the captured images (Step S404). The predetermined image processing herein is processing including A/D conversion, shading correction, line-to-line correction, resolution conversion, and gamma conversion.

When the background-pattern-added page data TPD' is obtained (Step in S404), the background pattern extraction portion 203 performs predetermined image analysis, so that a background pattern TP added to the obtained background-pattern-added page data TPD' is extracted (Step S405).

The background pattern extraction portion 203 also determines an encrypted password value and an encryption method corresponding to the background pattern TP extracted. Subsequently, the background pattern extraction portion 203 decrypts the encrypted password value based on the determined encryption method. Thereby, the original password before the encryption is obtained (Step S406).

When the original password is obtained (Step in S406), the security level analysis portion 204 determines a security level indicating the degree of protection of the page corresponding to the password based on the first determination table LT2 shown in FIG. 14 or the second determination table LT3 shown in FIG. 15 (Step S407).

To be specific, when the encryption method determined in Step S405 is the DES encryption method, the security level analysis portion 204 determines the security level by comparing the form (complexity, length, and so on) of the password obtained in Step S406 with the details indicated in the first determination table LT2 (see FIG. 14).

The first determination table LT2 of FIG. 14 shows relationships between complexity/length of a password and a security level. Here, security levels are rated on a scale of "1" through "4" in increasing order of security level. The complexity of a password represents a combination of types of letters of a letter string constituting the password. The length of a password represents the length of a letter string constituting the password.

When the encryption method determined in Step S405 is the AES encryption method, the security level analysis portion 204 determines the security level by comparing the form of the password obtained in Step S406 with the details indicated in the second determination table LT3 (see FIG. 15).

The second determination table LT3 of FIG. 15 shows relationships similar to those shown in the first determination table LT2. It is noted, however, that the security level classification is slightly different between the second determination table LT3 and the first determination table LT2. This is based on the fact that, even if the original password consists of the same letter string, the protection level by the encrypted password depends on an encryption method to be used. Specifically, this is based on the fact that, even if the original password consists of the same letter string, the protection level by the password encrypted by the AES encryption method is higher than that of the password encrypted by the DES encryption method.

The processing from Step S404 through Step S407 is performed repeatedly until the processing corresponding to the output unit page number is finished (Yes in Step S408). Thereby, background-pattern-added page data TPD' for each page to be printed onto the same sheet of paper is obtained, a background pattern TP for that page is extracted, a password for that page is obtained, and a security level for that page is determined. The processing result is summarized, so that the output target page list LT4 shown in FIG. 16 is created.

The output target page list LT4 contains registered information, for each page of the scanned document, such as page number LT4a, password information LT4b showing a password value set for the corresponding page, and security information LT4c showing a security level value for protection of the corresponding page.

The output target page list LT4 contains registered information by an amount corresponding to the output unit page number.

In the case, for example, where the "collective output mode" is set, the output target page list LT4 is created only once, and the output target page list LT4 contains registered information for all the pages of the document.

If both the "parallel output mode" and the "single-sided print mode" are set, and further, if the "N-in-1 mode" is set to be OFF, information for one page of the document is registered in the output target page list LT4. To be specific, information for Page 1 of the document is registered in the output target page list LT4 created for the first time, information for Page 2 of the document is registered in the output target page list LT4 created for the second time, and so on.

If both the "parallel output mode" and the "single-sided print mode" are set, and further, if the "2-in-1 mode" is set to be ON, information for two pages of the document is registered in the output target page list LT4. To be specific, information for Page 1 and Page 2 of the document is registered in the output target page list LT4 created for the first time, information for Page 3 and Page 4 of the document is registered in the output target page list LT4 created for the second time, and so on. In such a case, the two pages registered in the output target page list LT4 are sequential pages.

If both the "parallel output mode" and the "double-sided print mode" are set, and further, if the "N-in-1 mode" is set to be OFF, information for two pages of the document is registered in the output target page list LT4. To be specific, information for Page 1 and Page 2 of the document is registered in the output target page list LT4 created for the first time, information for Page 3 and Page 4 of the document is registered in the output target page list LT4 created for the second time, and so on. In such a case, the two pages registered in the output target page list LT4 are sequential pages.

If both the "parallel output mode" and the "double-sided print mode" are set, and further, if the "2-in-1 mode" is set to be ON, information for four pages of the document is registered in the output target page list LT4. To be specific, information for Page 1 through Page 4 of the document is registered in the output target page list LT4 created for the first time, information for Page 5 through Page 8 of the document is registered in the output target page list LT4 created for the second time, and so on. In such a case, the four pages registered in the output target page list LT4 are sequential pages.

If the "booklet mode" is set, information for four pages of the document is registered in the output target page list LT4. To be specific, information for Page 1, Page 2, Page N−1, and Page N of the document is registered in the output target page list LT4 created for the first time, information for Page 3, Page 4, Page N−3, and Page N−2 of the document is registered in the output target page list LT4 created for the second time, and so on. In such a case, the four pages registered in the output target page list LT4 are not limited to be sequential pages.

When the processing from Step S404 through Step S407 is performed the number of times corresponding to the output unit page number, the security level analysis portion 204 determines a security level of the entire output target pages (representative security level CL) (Step S409).

To be specific, the security level analysis portion 204 refers to the output target page list LT4. The security level analysis portion 204, then, determines, as a value of the representative security level CL, the highest value among the security level values indicated in the security information LT4c. Referring to the output target page list LT4 of FIG. 16, a value of the representative security level CL is determined to be "4".

After the representative security level CL is determined (Step S409 of FIG. 9), the password request need determination portion 205 checks whether or not there is information relating to an authenticated security level AL and a verified password AP (Step S410 of FIG. 10). Such information is not present if the processing by the password verifying portion 207 has never been performed. Descriptions on the authenticated security level AL, the verified password AP, and the password verifying portion 207 are given in due order.

If there are no authentication results (No in Step S410), then the password entry accepting portion 206 causes the display portion 19 to display the password entry screen HG2 as that shown in FIG. 17 (Step S413).

Displayed in the password entry target page display field F21 of the password entry screen HG2 are page number(s) of one or more pages for which the security information LT4c of the output target page list LT4 has the same value as that of the representative security level CL.

If the user knows a password for canceling the protection that has been provided on the pages indicated in the password entry target page display field F21 of the password entry screen HG2, then he/she enters the password in a "password" entry field F22, and presses an "EXECUTE" button F23. Otherwise, the user presses a "CANCEL" button F24.

Responsive to the "CANCEL" button F24 being pressed by the user (Yes in S414 of FIG. 10), the image processing apparatus 1 cancels the execution of the "copy" job, and destroys information on the job and so on (Step S415).

On the other hand, if the user enters the password and presses the "EXECUTE" button F23 (No in Step S414), then the password entry accepting portion 206 obtains the password entered by the user (entered password IP) via the operating portion 20 (Step S416).

When the entered password IP is obtained (Step S416), the password verifying portion 207 compares the value of the entered password IP and the value of the representative password CP (Step S417). At this time, if there are a plurality of values as the representative password CP, then the password verifying portion 207 compares the value of the entered password IP and all the values of the representative password CP.

When the password verifying portion 207 finds, through the comparison, a value of the representative password CP matching the value of the entered password IP (downward in Step S417), the authentication result storage portion 208 stores the value of the entered password IP as the value of the verified password AP, and stores a value of security level of the protection by the password as the value of the authenticated security level AL (Step S418). In short, the authentication result storage portion 208 stores information on authentication result for the case where the user was successfully authenticated. It is noted that, even when information on authentication result is already stored, the authentication result storage portion 208 adds information on new authentication result without overwriting the already-stored information. Stated differently, every time a user is successfully authenticated, information on authentication result is accumulated in the authentication result storage portion 208.

The print control portion 105 performs processing for printing images corresponding to the output unit page number in the following manner (Step S419). The print control portion 105 delivers, to the printing unit 17, the background-pattern-added page data TPD' corresponding to the output unit page number. At this time, the print control portion 105 also delivers information on print settings corresponding to the setting details of (2) through (5) discussed above. The print control portion 105 controls the paper supplying portion 15, the paper conveying portion 16, the printing unit 17, and so on to operate at an appropriate timing in order that images based on the delivered data are printed onto paper.

On the other hand, when the password verifying portion 207 does not find, through the comparison, a value of the representative password CP matching the value of the entered password IP (right in Step S417), the password entry accepting portion 206 causes the display portion 19 again to display the password entry screen HG2 as that shown in FIG. 17 (Step S413).

As discussed above, the representative password CP is used as a password for canceling the protection of the entire output unit page at a time (for giving permission to output images corresponding to the entire output unit page).

If there are authentication results (Yes in Step S410), then the password request need determination portion 205 determines whether or not it is necessary to ask the user to enter a password in the following manner (Step S411).

Referring to FIG. 12, the password request need determination portion 205 first compares the value of the representative security level CL determined this time with the highest value of the values of the authenticated security level AL stored in the authentication result storage portion 208 (Step S601).

If the value of the representative security level CL is smaller than the highest value of the values of the authenticated security level AL (left in Step S601), then the password request need determination portion 205 determines that it is unnecessary to ask the user to enter a password (Step S602).

If the value of the representative security level CL is larger than the highest value of the values of the authenticated security level AL (right in Step S601), then the password request need determination portion 205 determines that it is necessary to ask the user to enter a password (Step S603).

If the value of the representative security level CL is equal to the highest value of the values of the authenticated security level AL (downward in Step S601), then the password request need determination portion 205 refers to the output target page list LT4 (FIG. 16), and obtains, as a value of the representative password CP, a password value indicated in the password information LT4b for a page for which the security information LT4c has the same value as the representative security level CL. At this time, if there are a plurality of password values satisfying such requirements, the password request need determination portion 205 obtains all the password values. For example, in the illustrated example of FIG. 16, if the value of the representative security level CL is "4", the password request need determination portion 205 obtains, as representative password values, two values of "Pass1", which is a password of page number "1", and of "Pass4", which is a password of page number "4".

The value of the representative password CP is compared with the value of the verified password AP (Step S604). At this time, if there are a plurality of values as the representative password CP, or, alternatively, if there are a plurality of values as the verified password AP, then a comparison is made for every pair of the representative password CP and the verified password AP. For example, when there are two values as the representative password CP and three values as the verified password AP, comparisons are made for six pairs of the representative password CP and the verified password AP.

When finding, through the comparison, a pair of the representative password CP and the verified password AP that are equal to each other in value (left in Step S604), the password request need determination portion 205 determines that it is unnecessary to ask the user to enter a password (Step S602). On the other hand, when not finding, through the comparison, any values of the representative password CP and the verified password AP equal to each other (right in Step S604), the password request need determination portion 205 determines that it is necessary to ask the user to enter a password (Step S603).

Referring back to FIG. 10, when the analysis result in Step S412 shows that it is unnecessary to ask the user to enter a password (No in Step S412), the processing from Step S413 through Step S418 is bypassed. Then, the print control portion 105 performs the processing for printing images corresponding to the output unit page number in the foregoing manner (Step S419).

On the other hand, when the analysis result in Step S412 shows that it is necessary to ask the user to enter a password (Yes in Step S412), the password entry accepting portion 206 causes the display portion 19 to display the password entry screen HG2 (FIG. 17) (Step S413). The subsequent processing is the same as that for the case of "No" in Step S410.

The processing from Step S404 through Step S419 is performed repeatedly until the processing for all the pages of the document is finished (Yes in Step S420). Stated differently, the processing from Step S404 through Step S419 is performed in turn for each of groups obtained by making groups so that at least one page of the document is included, i.e., by making groups for each output unit page number.

As discussed above, a document to which a background pattern TP is added is copied in the foregoing manner. Note that the processing order, the processing unit, and so on in Step S401 through Step S420 are merely one example and are not limitative.

According to this embodiment, the image processing apparatus 1 automatically determines a security level for protection of each page of a document based on a structure of a password corresponding to a background pattern TP added to the page. Subsequently, the image processing apparatus 1 asks, only when necessary, a user to enter a password depending on the determined security level. Accordingly, in making a copy of a document to which different background patterns are added on a page-by-page basis, it is unnecessary for the user to enter a password for a page assigned a security level lower than that of a page that has been successfully authenticated. Stated differently, although the user was conventionally required to enter a password for each output of sheet of paper, such a burden task is saved in the image processing apparatus 1 according to the embodiment, which increases the usability thereof. In addition, a page for which password entry is omitted is a page for which a user is not required to enter a password in view of the security level. Thus, in copying a document with a background pattern TP, the same security level as that in the conventional techniques is ensured.

Descriptions are provided below of an example of operation performed by a user when he/she uses the image processing apparatus 1 of this embodiment to copy a document to which a background pattern is added.

The descriptions are given below by taking examples of the following three cases: a case of copying an eight-page document to which a background pattern is added when both the "collective output mode" and the "single-sided print mode" are set, and the "N-in-1 mode" is set to be OFF (hereinafter called a first case); a case of copying an eight-page document to which a background pattern is added when both the "parallel output mode" and the "single-sided print mode" are set, and the "N-in-1 mode" is set to be OFF (hereinafter called a second case); and a case of copying an eight-page document to which a background pattern is added when both the "parallel output mode" and the "single-sided print mode" are set, and the "2-in-1 mode" is set to be ON (hereinafter called a third case).

[First Case]

FIG. 18 is a diagram showing an example of an outline for the first case.

The outline UC1 shown in FIG. 18 indicates condition settings for the first case and necessity or lack of necessity of password entry by a user.

It is assumed that a background pattern TP corresponding to a password value shown in a password field UC1a of the outline UC1 is added to each page of a document. A page for which the value "required" is indicated in a necessity/lack of necessity of password entry field UC1c of the outline UC1 is a page for which a user is required to enter a password. On the other hand, a page for which the value "non-required" is indicated therein is a page for which a user is not required to enter a password.

The user places a document on the document sheet feeder 11, selects a "copy" menu in the operating portion 20, enters the foregoing settings, and presses an EXECUTE button.

In response to this operation, the image processing apparatus 1 captures images depicted on Page 1 through Page 8 of the document, obtains passwords therefor, and determines security levels of Page 1 through Page 8 of the document. Then, among the security levels of Page 1 through Page 8, the image processing apparatus 1 determines that a representative security level value is the highest level value "4". The user is required to enter the password "Aa1Bb2Cc3Dd4" for Page 6 on which protection corresponding to the representative security level "4" is provided. The user is, however, not required to enter passwords set for the other pages.

According to the first case, the user is required to enter a password only once, while he/she is conventionally required to enter passwords eight times.

[Second Case]

FIG. 19 is a diagram showing an example of an outline for the second case.

The outline UC2 shown in FIG. 19 indicates condition settings for the second case and necessity or lack of necessity of password entry by a user.

It is assumed that a background pattern TP corresponding to a password value shown in a password field UC2a of the outline UC2 is added to each page of a document. A page for which the value "required" is indicated in a necessity/lack of necessity of password entry field UC2c of the outline UC2 is a page for which a user is required to enter a password. On the other hand, a page for which the value "non-required" is indicated therein is a page for which a user is not required to enter a password.

The user places a document on the document sheet feeder 11, selects a "copy" menu in the operating portion 20, enters the foregoing settings, and presses an EXECUTE button.

In response to this operation, as the first processing, the image processing apparatus 1 captures an image depicted on Page 1 of the document, obtains a password "123", and determines that the security level is "1". Since this is the first processing, the user is required to enter the password "123". At this point in time where the password is entered, the user acquires the security level "1".

Next, as the second processing, the image processing apparatus 1 captures an image depicted on Page 2 of the document, obtains a password "abc", and determines that the security level is "1". The security level "1" for Page 2 is the same value as that of the security level "1" that the user already acquired. However, the password "abc" is different from the password that the user already entered; therefore, the user is required to enter the password "abc". After the password entry, the security level acquired by the user remains unchanged, i.e., "1".

Next, as the third processing, the image processing apparatus 1 captures an image depicted on Page 3 of the document, obtains a password "Aa1", and determines that the security level is "2". Since the security level "2" for Page 3 is higher than the security level "1" that the user already acquired, the user is required to enter the password "Aa1". At this point in time where the password is entered, the security level acquired by the user rises from "1" to "2".

Subsequently, as the fourth processing, the image processing apparatus 1 captures an image depicted on Page 4 of the document, obtains a password "345", and determines that the security level is "1". Since the security level "1" for Page 4 is lower than the security level "2" that the user already acquired, the user is not required to enter the password "345".

Further, as the fifth processing, the image processing apparatus 1 captures an image depicted on Page 5 of the document, obtains a password "Aa1", and determines that the security level is "2". The security level "2" for Page 5 is the same value as that of the security level "2" that the user already acquired. Moreover, the password "Aa1" is the same as the password that the user already entered; therefore, the user is not required to enter the password "Aa1".

Next, as the sixth processing, the image processing apparatus 1 captures an image depicted on Page 6 of the document, obtains a password "Aa1Bb2Cc3Dd4", and determines that the security level is "4". Since the security level "4" for Page 6 is higher than the security level "2" that the user already acquired, the user is required to enter the password "Aa1Bb2Cc3Dd4". At this point in time where the password is entered, the security level acquired by the user rises from "2" to "4".

Subsequently, as the seventh processing, the image processing apparatus 1 captures an image depicted on Page 7 of the document, obtains a password "ABCabc", and determines that the security level is "3". Since the security level "3" for Page 7 is lower than the security level "4" that the user already acquired, the user is not required to enter the password "ABCabc".

Then, as the eighth processing, the image processing apparatus 1 captures an image depicted on Page 8 of the document, obtains a password "Cc3", and determines that the security level is "2". Since the security level "2" for Page 8 is lower than the security level "4" that the user already acquired, the user is not required to enter the password "Cc3".

According to the second case, the user is required to enter passwords only four times, while he/she is conventionally required to enter passwords eight times.

[Third Case]

FIG. 20 is a diagram showing an example of an outline for the third case.

The outline UC3 shown in FIG. 20 indicates condition settings for the third case and necessity or lack of necessity of password entry by a user.

It is assumed that a background pattern TP corresponding to a password value shown in a password field UC3a of the outline UC3 is added to each page of a document. A page for which the value "required" is indicated in a necessity/lack of necessity of password entry field UC3c of the outline UC3 is a page for which a user is required to enter a password. On the other hand, a page for which the value "non-required" is indicated therein is a page for which a user is not required to enter a password.

The user places a document on the document sheet feeder 11, selects a "copy" menu in the operating portion 20, enters the foregoing settings, and presses an EXECUTE button.

In response to this operation, as the first processing, the image processing apparatus 1 captures images depicted on Page 1 and Page 2 of the document, obtains a password "123" and a password "abc" for Page 1 and Page 2 respectively, and determines that the security level is "1" each for Page 1 and Page 2. The image processing apparatus 1 also determines that a representative security level for Page 1 through Page 2 is "1". Since this is the first processing, the user is required to enter any of the password "123" and the password "abc" for Page 1 and Page 2 on both of which the protection of the representative security level "1" is provided. At this point in time where the password is entered, the user acquires the security level "1".

Subsequently, as the second processing, the image processing apparatus 1 captures images depicted on Page 3 and Page 4 of the document, obtains a password "Aa1" and a password "345" for Page 3 and Page 4 respectively, and determines that the security levels are "2" and "1" for Page 3 and Page 4 respectively. The image processing apparatus 1 also determines that a representative security level for Page 3 through Page 4 is "2". Since the representative security level "2" is higher than the security level "1" that the user already acquired, the user is required to enter the password "Aa1" for Page 3 on which the protection of the representative security level "2" is provided. At this point in time where the password is entered, the security level acquired by the user rises from "1" to "2".

Further, as the third processing, the image processing apparatus 1 captures images depicted on Page 5 and Page 6 of the document, obtains a password "Aa1" and a password "Aa1Bb2Cc3Dd4" for Page 5 and Page 6 respectively, and determines that the security levels are "2" and "4" for Page 5 and Page 6 respectively. The image processing apparatus 1 also determines that a representative security level for Page 5 through Page 6 is "4". Since the representative security level "4" is higher than the security level "2" that the user already acquired, the user is required to enter the password "Aa1Bb2Cc3Dd4" for Page 6 on which the protection of the representative security level "4" is provided. At this point in time where the password is entered, the security level acquired by the user rises from "2" to "4".

Moreover, as the fourth processing, the image processing apparatus 1 captures images depicted on Page 7 and Page 8 of the document, obtains a password "ABCabc" and a password "Cc3" for Page 7 and Page 8 respectively, and determines that the security levels are "3" and "2" for Page 7 and Page 8 respectively. The image processing apparatus 1 also determines that a representative security level for Page 7 through Page 8 is "3". Since the representative security level "3" is lower than the security level "4" that the user already acquired, the user is not required to enter any of the password "ABCabc" for Page 7 and the password "Cc3" for Page 8.

According to the third case, the user is required to enter passwords only three times, while he/she is conventionally required to enter passwords eight times.

As discussed above, according to this embodiment, when a document protected by a password is copied, it is possible to reduce the number of times of password entry by a user with the security level ensured, leading to the improvement of usability of the image processing apparatus 1 for users.

Referring to the flowchart of FIG. 10, in the arrangement of this embodiment, even when there are a plurality of values as the representative password CP, one entered password IP is obtained in Step S416 (a user is prompted to enter one password), and the user is successfully authenticated as long as the entered password IP matches any one of the plurality of values as the representative password CP in Step S417. Instead of this, however, the following arrangement is also possible. When there are a plurality of values as the representative password CP, a plurality of entered passwords IP are obtained in Step S416 (a user is prompted to enter a plurality of passwords), and the user is successfully authenticated as long as all the entered passwords IP match all the values as the representative password CP in Step S417.

Referring to the flowchart of FIG. 12, in the arrangement of this embodiment, even when a value of the representative security level CL is slightly lower than a value of the authenticated security level AL in Step S601, it is determined that it is unnecessary to ask a user to enter a password. Likewise, even when the former value is slightly higher than the latter value, it is determined that it is necessary to ask a user to enter a password. Instead of this, however, the following arrangement is also possible. To be specific, when the former value is lower than the latter value by a predetermined value, it is determined that it is unnecessary to ask a user to enter a password. Likewise, when the former value is higher than the latter value by a predetermined value, it is determined that it is necessary to ask a user to enter a password.

Referring to the flowchart of FIG. 12, in the arrangement of this embodiment, when a value of the representative security level CL is equal to a value of the authenticated security level AL in Step S601, it is determined whether or not it is necessary to ask a user to enter a password by comparing a value of the representative password CP with a value of the verified password AP. Instead of this, however, the following arrangement is also possible. To be specific, even when a value of the representative security level CL is equal to a value of the authenticated security level AL in Step S601, it is determined whether or not it is necessary to ask a user to enter a password irrespective of values of the representative password CP and the verified password AP. For example, when the values of both the security levels are equal to each other, a determination is possible such that it is possible to ask a user to enter a password promptly.

In the forgoing embodiment, the example is described in which a document to which a background pattern TP is added is created by adding the background pattern TP to image data captured by the image processing apparatus 1. Instead of this, however, such a document can be created also by adding a background pattern TP to image data sent from another information processing device such as a personal computer connected to the image processing apparatus 1 via a network.

In the foregoing embodiment, the case is provided in which print output is used as a document output format. It is possible to use output formats other than the print output. For example, it is possible to use file output, to the HDD10*d*, of images obtained by scanning a document, or to use E-mail output of sending an electronic mail message to which captured images of a document are attached as an attachment.

In the foregoing embodiment, the case is discussed in which a document with a background pattern TP corresponding to a password is copied. Other than this, the embodiment is applicable to a case of copying a document to which information corresponding to a password is added in the form of barcode, QR code, and IC tag.

In the embodiments discussed above, the hardware configuration and the functional configuration of the image processing apparatus 1, and the like may be altered as required in accordance with the subject matter of the present invention. Further, the content to be processed, the processing sequence, and the like of the image processing apparatus 1 may be altered as required in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing apparatus for performing specific processing on each of images depicted on a plurality of pages of a document, each of the plurality of pages being a member assigned to at least any one of a plurality of groups, the image processing apparatus comprising a processor configured to:
   obtain a password set for each of the plurality of pages;
   determine first security levels of the plurality of pages, and determine, as a second security level of each of the plurality of groups, a first security level having a highest degree of security among the first security levels of the members of the plurality of groups;
   determine, before the specific processing on an N-th (N≥2) group of the plurality of groups, that entering an execution password is necessary if the second security level of the N-th group is higher than a second security level having a highest degree of security among the second security levels of a 1st group through an (N−1)-th group by a first predetermined level or more, and determine that entering the execution password is unnecessary if the second security level of the N-th group is smaller than said second security level by a second predetermined level or more, the execution password being the password set for a member whose first security level has a same degree of security as that of the second security level of the N-th group among the members of the N-th group; and
   perform the specific processing on the N-th group if the execution password is unnecessary for the N-th group, or, alternatively, if the execution password is necessary for the N-th group and if the execution password is appropriately entered.

2. The image processing apparatus according to claim 1, wherein, when the second security level of the N-th group is equal to the second security level having the highest degree of security among the second security levels of the 1st group through the (N−1)-th group, the processor is configured to determine that entering the execution password is necessary only if the password set for the member whose first security level has the same degree of security as that of the second security level of the N-th group among the members of the N-th group is different from any of other passwords that have been entered appropriately before performing the specific processing on the 1st group through the (N−1)-th group.

3. The image processing apparatus according to claim 1, wherein, before the specific processing on the N-th group, when the processor determines that entering the execution password is necessary, and when there are a plurality of members with the first security level having the same degree of security as that of the second security level of the N-th group among the members of the N-th group, the processor is configured to determine that entering the password set for any one of the plurality of pages is necessary.

4. The image processing apparatus according to claim 1, wherein, before the specific processing on the N-th group, when the processor determines that entering the execution password is necessary, and when there are a plurality of members with the first security level having the same degree of security as that of the second security level of the N-th group among the members of the N-th group, the processor is configured to determine that entering the password set for each of the plurality of pages is necessary.

5. The image processing apparatus according to claim 1, wherein the processor is configured to determine the first security levels of the plurality of pages based on a combination of types of letters of a letter string constituting the password set for each of the plurality of pages and a length of the letter string.

6. A method for performing specific processing on each of images depicted on a plurality of pages of a document, each of the plurality of pages being a member assigned to at least any one of a plurality of groups, the method comprising:
   controlling an image processing apparatus to perform first processing for obtaining a password set for each of the plurality of pages;
   controlling the image processing apparatus to perform second processing for determining first security levels of the plurality of pages, and determining, as a second security level of each of the plurality of groups, a first security level having a highest degree of security among the first security levels of the members of the plurality of groups;
   controlling the image processing apparatus to perform third processing, before the specific processing on an N-th (N≥2) group of the plurality of groups, for determining that entering an execution password is necessary if the second security level of the N-th group is higher than a second security level having a highest degree of security among the second security levels of a 1st group through an (N−1)-th group by a first predetermined level or more, and determining that entering the execution password is unnecessary if the second security level of the N-th group is smaller than said second security level by a second predetermined level or more, the execution password being the password set for a member whose first security level has a same degree of security as that of the second security level of the N-th group among the members of the N-th group; and
   controlling the image processing apparatus to perform the specific processing on the N-th group if it is determined that entering the execution password is unnecessary for the N-th group, or, alternatively, if it is determined that entering the execution password is necessary for the N-th group and if the execution password is appropriately entered.

7. A non-transitory computer-readable storage medium storing thereon a computer program used in an image processing apparatus for performing specific processing on each of images depicted on a plurality of pages of a document, each of the plurality of pages being a member assigned to at least any one of a plurality of groups, the computer program causing the image processing apparatus to implement processes comprising:
   obtaining a password set for each of the plurality of pages in a first processing;
   determining first security levels of the plurality of pages, and determining, as a second security level of each of the plurality of groups in a second processing, a first security level having a highest degree of security among the first security levels of the members of the plurality of groups;

third processing, before the specific processing on an N-th (N_>2) group of the plurality of groups, for determining that entering an execution password is necessary if the second security level of the N-th group is higher than a second security level having a highest degree of security among the second security levels of a 1st group through an (N −1)-th group by a first predetermined level or more, and determining that entering the execution password is unnecessary if the second security level of the N-th group is smaller than said second security level by a second predetermined level or more, the execution password being the password set for a member whose first security level has a same degree of security as that of the second security level of the N-th group among the members of the N-th group; and the specific processing on the N-th group if it is determined that entering the execution password is unnecessary for the N-th group, or, alternatively, if it is determined that entering the execution password is necessary for the N-th group and if the execution password is appropriately entered.

8. The non-transitory computer-readable storage medium according to claim 7, wherein, when the second security level of the N-th group is equal to the second security level having the highest degree of security among the second security levels of the 1st group through the (N −1)-th group, the third processing includes determining that entering the execution password is necessary only if the password set for the member whose first security level has the same degree of security as that of the second security level of the N-th group among the members of the N-th group is different from any of other passwords that have been entered appropriately before performing the specific processing on the 1st group through the (N −1)-th group.

9. The non-transitory computer-readable storage medium according to claim 7, wherein, before the specific processing on the N-th group, when it is determined that entering the execution password is necessary, and when there are a plurality of members with the first security level having the same degree of security as that of the second security level of the N-th group among the members of the N-th group, the third processing includes determining that entering the password set for any one of the plurality of pages is necessary.

10. The non-transitory computer-readable storage medium according to claim 7, wherein, before the specific processing on the N-th group, when it is determined that entering the execution password is necessary, and when there are a plurality of members with the first security level having the same degree of security as that of the second security level of the N-th group among the members of the N-th group, the third processing includes determining that entering the password set for each of the plurality of pages is necessary.

11. The non-transitory computer-readable storage medium according to claim 7, wherein the second processing includes determining the first security levels of the plurality of pages based on a combination of types of letters of a letter string constituting the password set for each of the plurality of pages and a length of the letter string.

\* \* \* \* \*